US011438750B2

(12) United States Patent
Lindholm et al.

(10) Patent No.: US 11,438,750 B2
(45) Date of Patent: Sep. 6, 2022

(54) SAFETY ALERT LOCATION-BASED SOCIAL NETWORK SYSTEM

(71) Applicants: Andreas Lindholm, Denia (ES); Tony Fahlström, Upplands Vasby (SE)

(72) Inventors: Andreas Lindholm, Denia (ES); Tony Fahlström, Upplands Vasby (SE)

(*) Notice: Subject to any disclaimer, the term of this patent is extended or adjusted under 35 U.S.C. 154(b) by 0 days.

(21) Appl. No.: 17/057,897

(22) PCT Filed: May 23, 2019

(86) PCT No.: PCT/SE2019/050472
§ 371 (c)(1),
(2) Date: Nov. 23, 2020

(87) PCT Pub. No.: WO2019/226113
PCT Pub. Date: Nov. 28, 2019

(65) Prior Publication Data
US 2021/0204107 A1 Jul. 1, 2021

(30) Foreign Application Priority Data
May 24, 2018 (SE) .................................... 1850621-2

(51) Int. Cl.
*H04W 4/90* (2018.01)
*H04W 4/21* (2018.01)
(Continued)

(52) U.S. Cl.
CPC .............. *H04W 4/90* (2018.02); *G06F 40/58* (2020.01); *H04W 4/025* (2013.01); *H04W 4/12* (2013.01); *H04W 4/21* (2018.02)

(58) Field of Classification Search
CPC ......... H04W 4/90; H04W 4/025; H04W 4/12; H04W 4/21; H04W 4/021; H04W 4/02;
(Continued)

(56) References Cited

U.S. PATENT DOCUMENTS

2010/0190468 A1* 7/2010 Scott ................. H04M 1/72457
455/404.2
2011/0062226 A1 3/2011 Mitchell, Jr. et al.
(Continued)

FOREIGN PATENT DOCUMENTS

EP 3282432 2/2018
JP 2013135392 A * 7/2013 ......... H04L 12/4625
(Continued)

OTHER PUBLICATIONS

Extended European search report issued in EP Application No. EP19806582.3 dated Jul. 15, 2021, 14 pages.
(Continued)

*Primary Examiner* — Charles N Appiah
*Assistant Examiner* — Frank E Donado
(74) *Attorney, Agent, or Firm* — RC Trademark Company

(57) ABSTRACT

A method for providing a safety alert in a network system (400), the system comprising at least one User Equipment (UE 100), the UE (100) being a member of at least one network (410) being associated with a resource device (RD 300), the method comprising: the UE (100) receiving safety-related information associated with the network; displaying the safety-related information (140); receiving a selection of a RD (300) and in response thereto receiving data from the RD (300) and displaying the data of the RD (300); providing at least one selectable user alert action, wherein at least one user alert action is based on the received data of the RD (300); receiving a selection of a user alert action; and executing the user alert action, wherein the user alert action is one taken from the group comprising {sending an alert and posting a notification} through a transmission to at least one other member of the network.

11 Claims, 14 Drawing Sheets

(51) Int. Cl.
*G06F 40/58* (2020.01)
*H04W 4/02* (2018.01)
*H04W 4/12* (2009.01)

(58) Field of Classification Search
CPC . G06F 40/58; G08B 25/016; G08B 13/19613;
G08B 25/08; G08B 25/10
See application file for complete search history.

(56) References Cited

U.S. PATENT DOCUMENTS

| | | | |
|---|---|---|---|
| 2012/0005224 A1 | 1/2012 | Ahrens et al. | |
| 2013/0050480 A1* | 2/2013 | Ebenezer | E21B 47/002 348/143 |
| 2013/0157612 A1* | 6/2013 | Cordero | H04W 4/90 455/404.2 |
| 2014/0012932 A1 | 1/2014 | Sharaf et al. | |
| 2014/0120863 A1* | 5/2014 | Ferguson | H04W 76/50 455/404.1 |
| 2014/0359008 A1 | 12/2014 | Finney et al. | |
| 2014/0368601 A1* | 12/2014 | deCharms | H04N 7/147 348/14.02 |
| 2015/0172897 A1 | 6/2015 | Mariathasan et al. | |
| 2015/0264006 A1* | 9/2015 | Parra | H04L 67/18 709/206 |
| 2017/0163781 A1* | 6/2017 | Seshan | G06F 3/0483 |
| 2017/0318147 A1 | 11/2017 | Merjanian et al. | |
| 2017/0344748 A1 | 11/2017 | Ghani et al. | |
| 2018/0048688 A1* | 2/2018 | Siminoff | G08B 25/08 |

FOREIGN PATENT DOCUMENTS

WO 2014169232 10/2014
WO 2017143260 8/2017

OTHER PUBLICATIONS

First Examination Report issued in IN Application No. IN202017055853 dated Sep. 15, 2021, 6 pages.

* cited by examiner

SAFETY ALERT LOCATION-BASED SOCIAL NETWORK SYSTEM

TECHNICAL FIELD

This application relates to an improved safety alert network system and in particular to a system and a method for performing improved safety alerts.

BACKGROUND

Contemporary safety systems allows for contacting a group of people when an alert is set off. The international patent application published as WO2013062475 discloses one such system, where a mobile device which has a memory, a socket and a controller. The socket is configured to receive a plug, and the controller is configured to detect that a plug is received in the socket; determine that a start point has been reached and in response thereto activate a safety application; and detect that the plug is removed from the socket, and, in response thereto, cause the safety application to activate an alarm, the alarm being sent to one or several contacts and in a number of different manners. In one embodiment the controller is configured to contact all rescuers. In one embodiment the controller is configured to contact one rescuer at a time. In one such embodiment the controller is configured to contact the rescuers in order of priority. In one embodiment the controller is configured to contact a lower priority rescuer if it is not possible to contact a higher priority rescuer. In one embodiment the controller is configured to contact a rescuer via a voice call. In one such embodiment the controller is configured to play a pre-recorded or speech synthesized message to the rescuer upon call pick up. In one embodiment the controller is configured to connect a voice call to allow the rescuer to communicate directly with the user. In one embodiment the controller is configured to contact a rescuer via a text message, such as a Short Message Service (SMS) message or a Media Message Service (MIMS) message. In one such embodiment the controller is configured to retrieve data pertaining to a current location and to attach the location data to the message to allow the rescuer to ascertain the user's location. In one embodiment the controller is configured to contact a rescuer via a pre-specified coded communication. Such a communication is in one embodiment a call to a call center wherein the controller is configured to sound a coded message using for example DTMF (Dual Tone Multiple-Frequency) tones. The coded message is arranged to carry information identifying the user and that an alarm has been activated. In one embodiment the controller is configured to retrieve data pertaining to a current location and to attach the location data to the message to allow the rescuer to ascertain the user's location. In this system only specified rescuers are contacted and the last resort is to play an audible alarm as an alarm is triggered.

Another system is disclosed in the international patent application published as WO2017216369 that discloses a telecare system which comprises a mobile terminal, which has a controller, and a telecare terminal. The controller of the mobile terminal is configured to detect a selective action by a user, attempt to communicate with the telecare terminal using short-range wireless communication in response to the detected action, and if the communication was successful, cause transmittal of an assistance request for a first telecare service and if not, cause transmittal of an assistance request for a second telecare service. This system also only allows for contacting pre-specified services, and in a specified order, depending on the success of contacting the different contacts.

Various systems exist where a camera or lock may be remotely monitored. Such systems may allow a user to remotely control the angle of a camera and to receive a live stream (or a recording) from the camera.

However, such systems do not contact other services or contacts than pre-specified contacts. Such systems are thus ill-suited for providing information to a large group of people regarding safety issues and also to ensure that an alert is received by someone, as all specified contacts may be busy or unreachable.

Thus, there is a need for improved provision of alerts and safety information.

SUMMARY

As will be disclosed in detail in the detailed description, the inventors have realized that sharing both resources and information in one or more networks enables for an improved safety alert system.

The networks discussed herein are social networks, unless specifically stated otherwise.

It is also an object of the teachings of this application to overcome the problems by providing a method for providing a safety alert in a network system, the system comprising at least one User Equipment (UE), the UE being a member of at least one network being associated with a resource device (RD), the method comprising: the UE receiving safety-related information associated with the network; displaying the safety-related information; receiving a selection of a RD and in response thereto receiving data from the RD and displaying the data of the RD; providing at least one selectable user alert action, wherein at least one user alert action is based on the received data of the RD; receiving a selection of a user alert action; and executing the user alert action, wherein the user alert action is one taken from the group comprising {sending an alert and posting a notification} through a transmission to at least one other member of the network.

The safety-related information that is provided to a user is mainly text-based possibly accompanied with graphic or other information, and is not merely a sensor reading, an alarm request or a direct request.

The safety-related information provides information to a user which enables the user to make an informed decision on which resources to use to retrieve additional data in order to make decisions on further actions to take. The underlying social network provides the flexible communication platform through that enables the user to receive and retrieve the safety-related information and the needed or desired sensor readings.

It is also an object of the teachings of this application to overcome the problems by providing a user equipment comprising a memory, a controller and a communication interface for connecting with a network in a safety alert network system comprising at least one network, the UE being a member of at least one network, and the network being associated with a resource device (RD), the controller being configured to: receive safety-related information associated with the network; display the safety-related information; receive a selection of a RD and in response thereto receive data from the RD and display the data of the RD; provide at least one selectable user alert action, wherein at least one user alert action is based on the received data of the RD; receive a selection of a user alert action; and execute the user alert action, wherein the user alert action is one taken from the group comprising {sending an alert and posting a notification} through a transmission to at least one other member of the network.

It is also an object of the teachings of this application to overcome the problems by providing a safety alert network system, the system comprising at least one User Equipment (UE), the UE being a member of at least one network being associated with a resource device (RD), the UE being configured to: receive safety-related information associated with the network; display the safety-related information; receive a selection of a RD and in response thereto receive data from the RD and display the data of the RD; provide at least one selectable user alert action, wherein at least one user alert action is based on the received data of the RD; receive a selection of a user alert action; and execute the user alert action, wherein the user alert action is one taken from the group comprising {sending an alert and posting a notification} through a transmission to at least one other member of the network.

It is also an object of the teachings of this application to overcome the problems by providing a computer-readable medium carrying computer instructions that when loaded into and executed by a controller of a UE enables the UE to implement an embodiment of the present invention.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

FIG. 1 is a series of figures each showing one example of a user equipment capable of implementing the invention as disclosed herein.

Common to all user equipment is that they are capable of communicating with another user equipment. The communication may be implemented through a wireless interface. The wireless interface may be a long range interface, such as GSM (Global Systeme Mobile), LTE (Long Term Evolution), HSDPA (High Speed Data Packet Access) or other long range Radio access Technology (RAT). Alternatively or additionally the wireless interface may be a short range interface, such as WiFi™ (IEEE 802.11), Bluetooth™ or NFC (Near-Field Communication) or other short range RAT. The interface may also or alternatively be wired, such as through a LAN (Local Area Network) cable, an Ethernet cable, an RS-232 cable or a USB (Universal serial Bus) cable.

Regardless, whether the communication interface is wired, wireless or both, possibly alternating between the two, the communication interface is utilized by the user equipment to communicate with other user equipment, presumably through an internet connection. The communication interface may also be used to communicate with resource devices, either directly or through another device or user equipment.

Figure 1A:
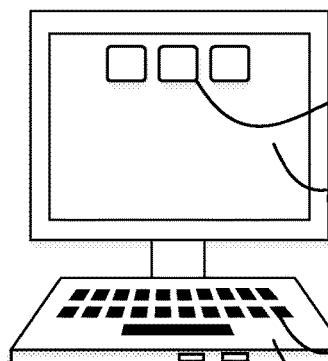
FIG. 1A shows an example of a user equipment according to one embodiment of the present invention.

FIG. 1A shows an example of a User Equipment 100, in this example being a desktop computer or a work station 100. The computer has at least one housing 110 which is arranged to house a user interface (UI) comprising a screen 120 and one or several buttons or keys 130. The screen 120 is configured to display graphical objects 140. The graphical objects may be virtual buttons 130. The housing also comprises several components, such as a processor arrangement, or controller, which components will be described in further detail below with reference to FIG. 2. The work station 100 is arranged with several ports 150, such as wired connections 150, for connecting with various peripheral devices. The ports 150 may also be used to connect to a resource device, the ports 150 then being part of the communication interface.

Figure 1B:
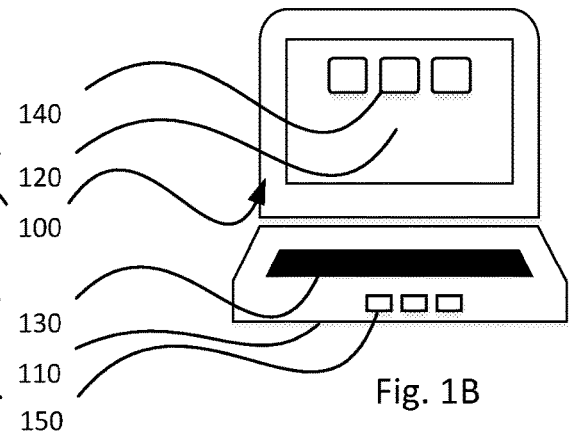
FIG. 1B shows an example of a user equipment according to one embodiment of the present invention.

FIG. 1B shows an example of a User Equipment 100, in this example being a laptop computer 100. The laptop has a housing 110 which is arranged to house a user interface (UI) comprising a screen 120 and one or several buttons or keys 130. The screen 120 is configured to display graphical objects 140. The graphical objects may be virtual buttons 130. The housing also comprises several components, such as a processor arrangement, or controller, which components will be described in further detail below with reference to FIG. 2. The laptop 100 is also arranged with several ports 150, such as wired connections 150, for connecting with various peripheral devices. The ports 150 may also be used to connect to a resource device, the ports 150 then being part of the communication interface 150.

Figure 1C:
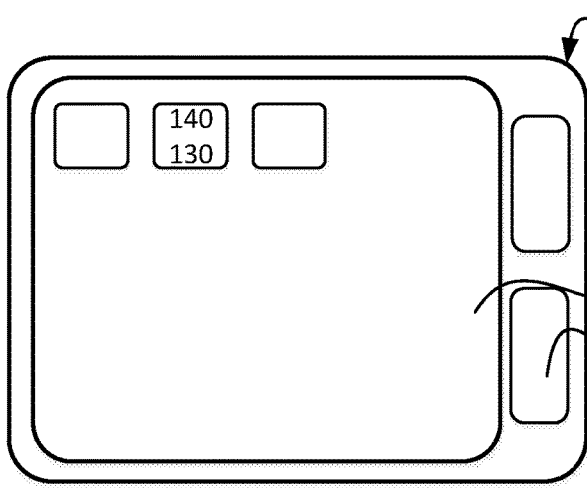
FIG. 1C shows an example of a user equipment according to one embodiment of the present invention.

FIG. 1C shows an example of a User Equipment 100, in this example being a tablet computer 100. The tablet has a housing 110 which is arranged to house a user interface (UI) comprising a screen 120 and one or several buttons or keys 130. The screen 120 is a touch screen configured to display graphical objects 140. The graphical objects may be virtual buttons 130. The housing also comprises several components, such as a processor arrangement, or controller, which components will be described in further detail below with reference to FIG. 2. The tablet 100 is also arranged with at least one port 150 for receiving a charger. The charging port 150 may also be arranged for connecting with various peripheral devices. The port 150 may also be used to connect to a resource device, the port 150 then being part of the communication interface 150.

Figure 1D:
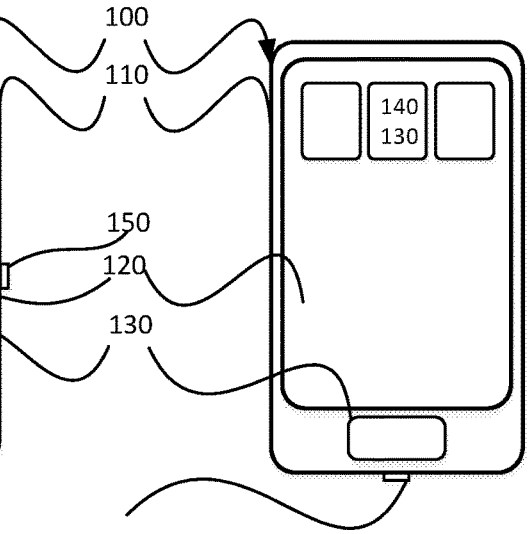
FIG. 1D shows an example of a user equipment according to one embodiment of the present invention.

FIG. 1D shows an example of a User Equipment 100, in this example being a smartphone 100. The smartphone has a housing 110 which is arranged to house a user interface (UI) comprising a screen 120 and one or several buttons or keys 130. The screen 120 is a touch screen configured to display graphical objects 140. The graphical objects may be virtual buttons 130. The housing also comprises several components, such as a processor arrangement, or controller, which components will be described in further detail below with reference to FIG. 2. The smartphone 100 is also arranged with at least one port 150 for receiving a charger. The charging port 150 may also be arranged for connecting with various peripheral devices. The port 150 may also be used to connect to a resource device, the port 150 then being part of the communication interface 150.

Figure 2:
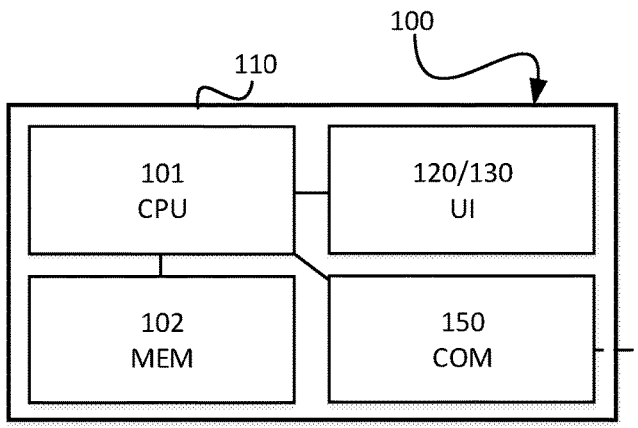
FIG. 2 shows a schematic view of the components of an example of a user equipment according to one embodiment of the present invention.

FIG. 2 shows a component view of a user equipment (UE) 100 as exemplified in FIGS. 1A, 1B, 1C and 1D. The UE 100 comprises a user interface 130 as discussed in relation to FIGS. 1A, 1B, 1C and 1D and a communication interface (COM) 150 for communicating with other devices, such as other UEs 100 or resource devices (RDs). The communication may be implemented wired and/or wireless, possibly alternating between communication standards depending on communication environment. For example a wired connection may be used for a short range, high-speed, dedicated connection, and a wireless connection may be used for a long-range, encrypted connection.

The UE 100 also comprises a processor arrangement, or controller, 101 comprising one or more processors, such as central processing units or other general purpose programmable circuits, or dedicated processors. As a skilled person would realize, the exact arrangement of the controller and which aspect of the controller performs which task is beyond the scope of this application and not primarily relevant to the implementation of the invention. Suffice to say that the controller 101 is configured to control the general operation of the UE 100. Connected to the controller 101 is a computer readable memory arrangement 102 configured to store information such as instructions and data. The instructions are to be executed by the controller for controlling the operation of the UE 100. The memory arrangement 102 may be of one or several levels, possibly being of a different type of physical memory. Examples of memories are RAM or DRAM (being non-volatile memories) and ROM, PROM, EEPROM (being volatile memories). The memory 102 may be internal to the UE 100 or it may be external and connected, wirelessly or wired, or it may be a combination of internal and external memories.

The controller 101 is also connected to a user interface (UI) 130/140 for receiving data from a user and to output data to a user. This enables a user to provide control instructions to the UE 100 and to receive information such as the result of a given command. As discussed in relation to FIGS. 1A, 1B, 1C and 1D, the user interface may differ greatly from UE to UE, but the general concept is the same, to receive and to output data.

To enable the UE 100 to communicate with other devices, such as other UEs or resource devices, the controller 101 is also connected to a communication interface (COM) 150. As discussed in relation to FIGS. 1A, 1B, 1C and 1D (see above for examples of different communication standards), the communication interface may be wired or wireless, or a combination of the two. As also discussed and as would also be understood by a skilled person many different alternatives exist and listing all would be beyond the scope of this application. Suffice to say that the communication interface 150 enables for communication with other devices.

Through the communication interface 150, the UE 100 is enabled to represent the user of the UE 100 in a social network allowing the user to actively interact with other members of the social network.

Figure 3:
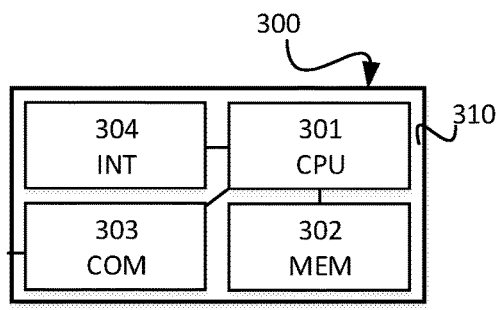
FIG. 3 shows a schematic view of the components of an example of a resource device according to one embodiment of the present invention.

FIG. 3 shows a component view of a resource device (RD) 300 that may be connected to a UE 100, either permanently, once or from time to time. The RD 300 comprises a controller 301, as discussed with relation to the UE 100, and a memory, as also discussed with relation to the UE 100. The controller 301 and the memory 302 of the RD 300 usually being of a more dedicated models, as they are designed to perform a smaller array of tasks than the UE. The RD 300 also has an interface 304 for receiving input, and possibly for providing output. The interface may comprise a user interface (control and on/off buttons etc.), but also comprises a device 304. The device 304 may be active for providing output, such as in an actuator device 304. An actuator device 304, may be an alarm device, a lock device, or other actuator related to safety or security measures or monitoring.

The device 304 may also or alternatively be a passive device for receiving input, such as a sensor device 304. The sensor device 304 may be a camera, a touch sensor, a motion sensor, a sound sensor, an alarm, or other sensor. The sensor is, in one embodiment, a sensor related to safety or security measures or monitoring.

The RD 300 also comprises a communication interface 303. The communication interface is for enabling the RD 300 to communicate with a UE, and/or possibly also with other RDs 300. The RD 300 may then receive instructions from a UE 100 (or other RD 300) and provide information or data (such as sensor readings, for example photos or video streams from a camera) to a UE 100. In one embodiment, the instructions are received via a social network.

Figure 4:
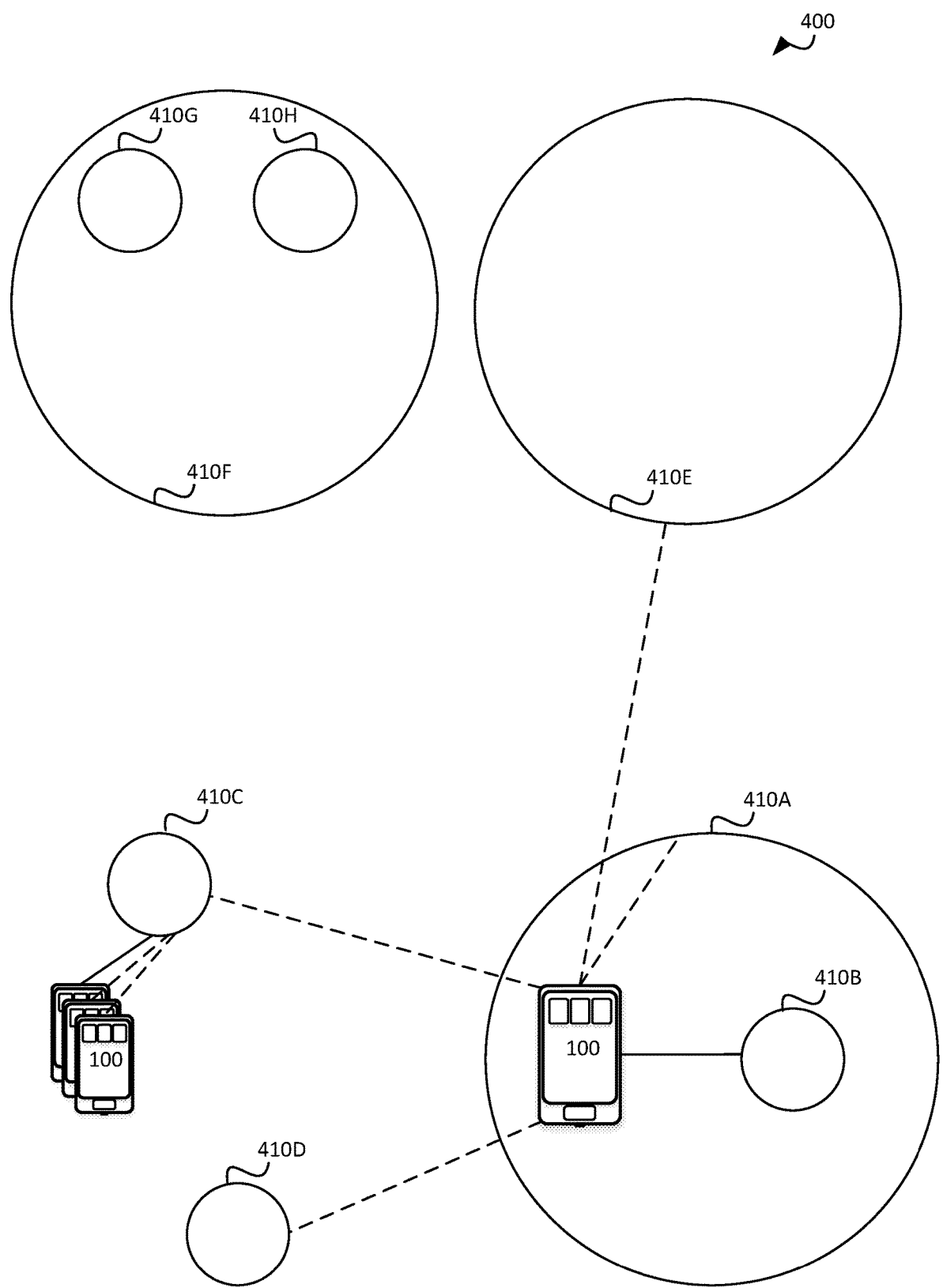
FIG. 4 shows a schematic view of an example safety alert network system according to one embodiment of the present invention.

FIG. 4 shows a schematic view of a safety alert network system 400 as per the present invention.

The safety alert network system is based on a safety-oriented and location—based social network, i.e. a social networking service. The networks discussed herein are thus not simple communication networks established between a plurality of devices, but networks implementing social networks enabling users to interact with one another and also characterizingly with resource devices.

A user is associated with one or more networks 410A-E. The association may be through a user identity or through an identity of a user's user equipment 100. In the figures of this application the user will be represented by the user equipment 100.

The networks of the present invention are associated with a locality, as indicated by the networks 410 of FIG. 4 having different sizes, indicating different localities. As can be seen in FIG. 4, the networks 410 may be overlapping, fully (as in FIG. 4) and/or partially (not shown for illustrative purposes of keeping the illustrations clear). A user may be associated with one or more networks 410, as indicated with the lines extending from the UE 100 to the various networks. In the example of FIG. 4, the UE 100 (and therefore also the user of the UE 100) is associated with Networks 410A, 410B, 410C, 410D and 410E, but not (yet) with networks 410F, 410G or 410H. As is also indicated in FIG. 4, a network 410C may also be associated with other users (represented by their user equipment). The association between a network and a UE is indicated by connecting lines in FIG. 4. In the example of FIG. 4, only one network 410C is shown to be associated with other users. However, it should be clear that all networks are assumed to be arranged to be associated with one or more UEs, however all these possible associations have been left out of the illustrations to prevent the illustrations from becoming too cluttered.

A user may have different roles in the network, the different roles giving different access rights. A higher role may be associated with more access rights, than a lower role. For example, an administrator may have rights to post notifications, add members, delete members, give rights to post, delete posts, and so on and a member may be allowed to both read posts and comment on posts, whereas a visiting member may only be allowed to read posts. In FIG. 4, the different roles are indicated with dashed versus full connecting lines, a full line indicating a higher role (such as an administrator), and a dashed line indicating a member (visiting or (semi-)permanent).

The association with a network, may be based on a membership of the network or a locality of the UE 100 coinciding with the locality of the network 410. As is shown in FIG. 4, a UE 100 may be associated with networks, such as networks 410A and 410B whose locality coincides or is similar to the locality of the UE 100. A network 410 may be associated with an area identifier for determining (possibly) overlapping localities with a UE 100. The area identifier may be a central position and a radius, which is compared to a position of the UE 100. Alternatively or additionally, the area identifier may be associated with a set of coordinates spanning a geographical area, which are compared to a position of the UE 100. Alternatively or additionally, the area identifier may be associated with a coding, such as a country code or area code used for telephonic services. In such an embodiment, the overlapping of localities would be determined through a comparison of a network's area or country code and a current area or country code used by a telecommunications network that the UE is currently connected with.

As can be seen in FIG. 4, a user may be administrator of one or more networks (only one is shown, network 410B), a member of networks with similar or overlapping localities (networks 410A and 410B), but also member of networks having a different locality (networks 410c, 410B and 410E). Memberships in such networks may be based on a membership in a real life club (like a local neighbourhood watch of a neighbourhood of a friend or relative, network 410D), being an employee at a company (network 410D), being a student at a school or other memberships not based on localities. This enables a user to receive public information (for example traffic accident information), company information (for example upcoming fire drills) and information of more personal interest (such as that there is a changing of the guards at the local neighbourhood watch of a neighbourhood of a friend or relative) all in one simple user interface.

A user may also be member of public networks that are based in localities of interest to the user. For example, if the network 410A of FIG. 4 is a public network for the city of Stockholm, a user living in Stockholm, Sweden would naturally be a member of that network. However, if the user perhaps has a vacation condo in Helsingborg, Sweden, or if the user has family there, the user may also be interested in what is happening in Helsingborg and thus choose (by posting a request for membership) to be member of the public network 410E of Helsingborg as well.

The Function of a Network

As should be clear all embodiments discussed in relation to the function of a network applies to all embodiments discussed in other portions of this text.

In addition to user's having different roles in different networks, different networks may also be of different types, the different types indicating different purposes or functions of the network. The type may be seen as being dependent on a general (perhaps not actual) administrator of the network.

One type of network is a public network owned and administered by an official organizations. A police network may be one such example, the general administrator then being the police headquarters (and the actual administrator being a (group of) user(s) assigned the task of administrating the network). An emergency service network may be another such example. A city or town network, administered by the governance of the city or town is another such example. As is indicated by the name, anyone may be member of a public network, they are public, but they may be (severely) restricted in as who has access or rights to what services). In general only the administrator would have a right to post notifications or other posts, whereas members could have a right to read and possibly to comment, whereas visiting members would only have a right to read posts.

Another type of network is a company or service associated network. Such a network may be associated with a security service. Another example may be a network associated with a work place or a school. This enables for providing members with notifications and posts about general and specific safety and security issues relevant to the work place. For example, the school administration may post about upcoming fire drills. Or, an employer may send out notifications about an ongoing security issues, such as unauthorized persons having been sighted. Such networks may be open networks, indicating that they are open to a general public, but that members should have some association to become a member.

Another type of network is a private network. Such a network may be associated with a user or smaller locality and requires all members to be actively approved by an administrator. Examples of such networks are neighbourhood watch systems and home security/family security networks.

FIGS. 5, 6, 7 and 8 each shows an example view of a user interface of an application or software module comprising computer-readable instructions having been downloaded into and being executed by a controller (101) of a UE 100, the computer-readable instructions enabling the UE to operate or function according to the present invention.

Figure 5:
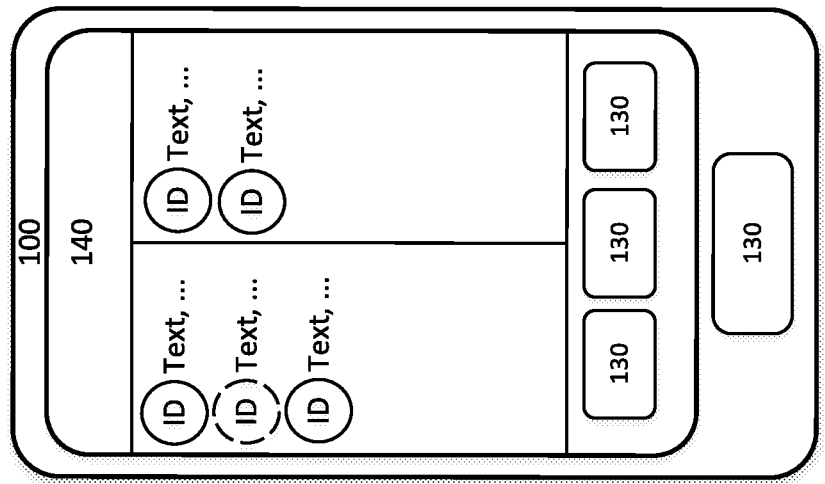
FIG. 5 shows an example view of a user interface of an application or software module comprising computer-readable instructions having been downloaded into and being executed by a controller of a user equipment, the computer-readable instructions enabling the user equipment to operate or function according to one embodiment of the present invention.

FIG. 5 shows an example view of how posts and notifications may be displayed in a UE 100 as part of the graphic content 140 being displayed. In this example each notification is accompanied by an identifier (ID) for the poster of the notification or post. The identifier may be textual and/or graphical. The identifier may indicate which network that the post or notification was posted in. The identifier may also or alternatively indicate which user that has posted the post or notification. The UE 100 may also provide controls 130 to change what is being displayed or to enable actions to be taken. In a UE having a touch screen, controls may also be provided through different touch commands, as would be apparent to a skilled person. Examples of such controls is to choose which networks to show (own, all, public, specific), or to change view, to open a network to change settings, to mention a few examples. One control may be to change to a map view, as seen in FIG. 6.

Figure 6:
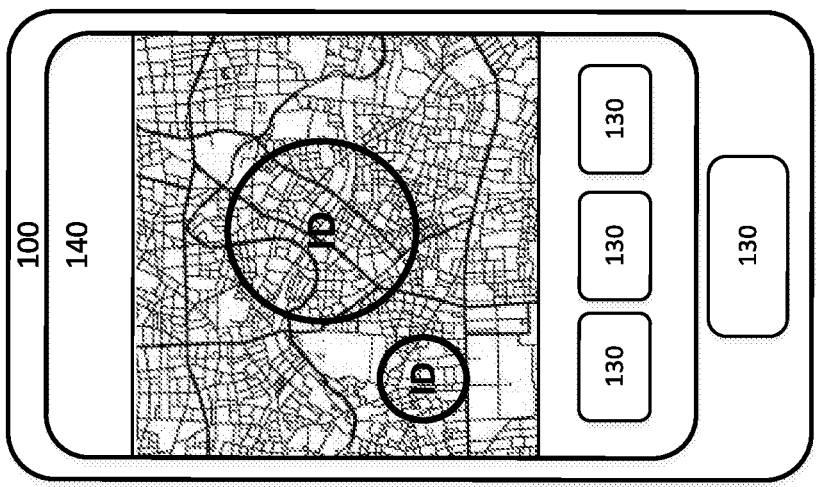
FIG. 6 shows an example view of a user interface of an application or software module comprising computer-readable instructions having been downloaded into and being executed by a controller of a user equipment, the computer-readable instructions enabling the user equipment to operate or function according to one embodiment of the present invention.

FIG. 6 shows an example view of how networks may be displayed in a UE 100 as part of the graphic content 140 being displayed. In this example each network is accompanied by an identifier (ID) for the network. A spatial locality of the network may also be indicated, possibly by indicating the spatial extent of the network. In the example of FIG. 6, the radius of the two networks being displayed is indicated by the circles. The identifier of the network may be textual and/or graphical.

Figure 7:
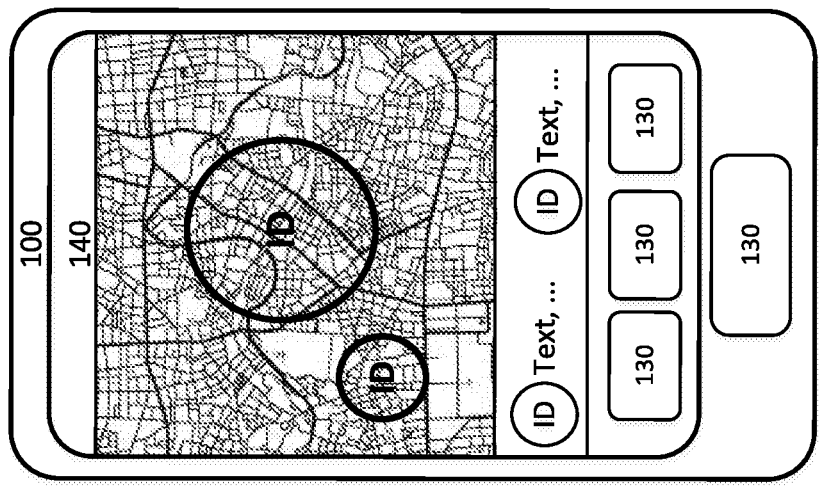
FIG. 7 shows an example view of a user interface of an application or software module comprising computer-readable instructions having been downloaded into and being executed by a controller of a user equipment, the computer-readable instructions enabling the user equipment to operate or function according to one embodiment of the present invention.

As an alternative, a combined map and post view may be provided, as shown in FIG. 7 which shows an example view of how networks along with posts and notifications may be displayed in a UE 100 as part of the graphic content 140 being displayed.

How Networks May be Used

As should be clear all embodiments discussed in relation to the use of a network applies to all embodiments discussed in other portions of this text.

The general use of the present invention is to enable for sharing of emergency and safety information to a large audience, and by a large group of information providers, not only through official information outlets.

In one embodiment safety-related information may be defined as information pertaining to posts, notifications, alerts, events, accidents, crises, attacks, medical emergencies, protests, surveillance, alarm statuses and/or other events involving safety or security equipment.

One purpose of the safety system as per the present invention is to provide a safety-oriented and location-based social network through (mobile) internet, where users can communicate more efficiently with others when emergencies happens. Users can access mobile applications. When an emergency happens, if a user is directly involved, the user can inform others with a text description possibly together with photo, video, voice message, and/or a request for help; if a user is not directly involved, but nearby the emergency, the user can receive latest information about the emergency, provide possible assist or stay safe. The safety-related information that is provided to a user is thus mainly text-based possibly accompanied with graphic or other information, and is not merely a sensor reading, an alarm request or a direct request.

The safety-related information provides information to a user which enables the user to make an informed decision on which resources to use to retrieve additional data in order to make decisions on further actions to take. The underlying social network provides the flexible communication platform through that enables the user to receive and retrieve the safety-related information and the needed or desired sensor readings.

Users can either make the communication on public channel, where anyone else nearby could read and join the communication; or make private communication within a group of people regardless of the location.

Users can join existing networks such as local community where they live and the company where they work, or create their own networks for the family or friends. The networks could work differently according to network type and network settings. The networks are thus associated with a location, such as the company, a town, a neighbourhood or even a country.

In one embodiment a network may simply be associated with a location or an area or region.

In one embodiment a user, represented by a UE can become a member of a network, by the UE simply being at the location or within the area (or region) associated with the network, or within a distance of the location or area. A user entering an area (or coming within a distance of a location) associated with a network, the UE will register this and the user will instantly, or after confirmation by an administrator and/or the user, become a member of the associated network.

When a public safety crisis has happened, such as terrorist attack, a fire, serious traffic accidents, then a government department, such as police department could send out both an emergency alert and a network alert in public network of an entire city, to inform the public about what has happened and what actions should be taken. The emergency alert will be received by people nearby the crisis, so they could take immediate actions according to government instruction. However, the network alert will also be received by all network members of the city public network, who normally are people live in the city. Even if they are not nearby the crisis, they still get to know what has happened, and be able to follow government instructions. Perhaps they can also use this information to inform friends or relatives they know are not members of such a network.

When an emergency incident or emergency has happened to a user, or a user has seen an incident or emergency has happened, the user could send out an alert to the public, describing the details. Each alert contains a geolocation, so other users would understand where it has happened. A user could alternatively or additionally add media contents (photo, video and voice recording) to help others understand more about what has happened. The alert could be used for different situations: if somebody is hurt or having medical emergency, the user could describe what assistance is needed; if it's a fire or serious traffic jam, the user could remind other people to stay out of the area. When the alert is sent out, users nearby (for example, within 10 km distance) will automatically receive it, which allows them to take follow up actions. They could also communicate with the sender and other users, to ask for more information, or provide suggestions. In certain situations, such as fire or burglary at home or in the office, user could alert only people inside a network (or several networks) by creating a network alert instead of emergency or public alert. It works almost the same as emergency and public alert, but only network members can see it and communicate on it.

Through the combination of public (general), open (company) and private networks, a user may choose to be provided with what security information that the user deems to be relevant to the user. By enabling other members, but the administrator to post comments and or posts to a larger network, the public may be used to provide relevant information on safety and security matters to a larger audience, than simply the connections of the user. The general public is thus made part of and relied upon in a general safety system for providing fast and localized security and safety information to other users. For example it is far more likely that a user out of thousands, witnesses an event that may affect the safety of other users, than that the local authorities do so. The local witness will thus be a much faster source of information on the event to other users than the local authorities. Also, as the local authorities are probably member of the same group (or perhaps the administrator), the local authorities may also be notified of the event at the same time.

The difference between a post and a notification is that a post is made by an administrator (or possibly a super user), whereas a notification is made by a network member (having access rights to post a notification.

Apart from enabling a user to read and to post posts, a user may also be giving permission to post an alert. An alert is in this context seen as an alarm, or at least as being associated with a timeliness or urgency. The difference between a post and an alert is that a post is of more general interest, whereas an alert has a more specific purpose as indicated by a specific sender, a specific recipient and/or a timeliness, such as issuing an alarm, whereas a post is more to provide information.

If a user only wants to distribute some information inside a network (or several networks), or start a communication, instead of creating an alert, he could thus create a network notification, for example, informing the office network that there will be power outage on Friday afternoon. Network notifications work almost the same as network alerts, but for normal communication purpose.

The alert may be sent out through a simple press or actuation of a control 130. The alert may also or alternatively be sent out through a series of menu chosen steps. As a combination, an alert may be sent out through a simple or a few simple actuations based on a predefined template, thus allowing for different alerts being sent out depending in the current circumstances.

An alert may be specified as to the current event (need urgent help, assistance needed, and so on . . . ), as to the specified sender, and as to the specified recipients. The recipients may be specified as specific contact(s), or as one or more networks. If a network is specified, all members of that network will receive the notification. In this manner, a user may, in certain situations, such as fire or burglary at home or in the office, alert only people inside a network (or several networks) by creating a network alert instead of an emergency or public alert. A network specific alert works almost the same as emergency and public alert, but only network members can see it and communicate on it. A public alert, on the other hand, is sent out to all UEs being in a vicinity, or perhaps members of an encompassing public network. The vicinity may be specified to be within a specified distance, such as 1 km, 5 km, 10 km, 15 km, 20 km or even a bigger distance.

Figure 8:
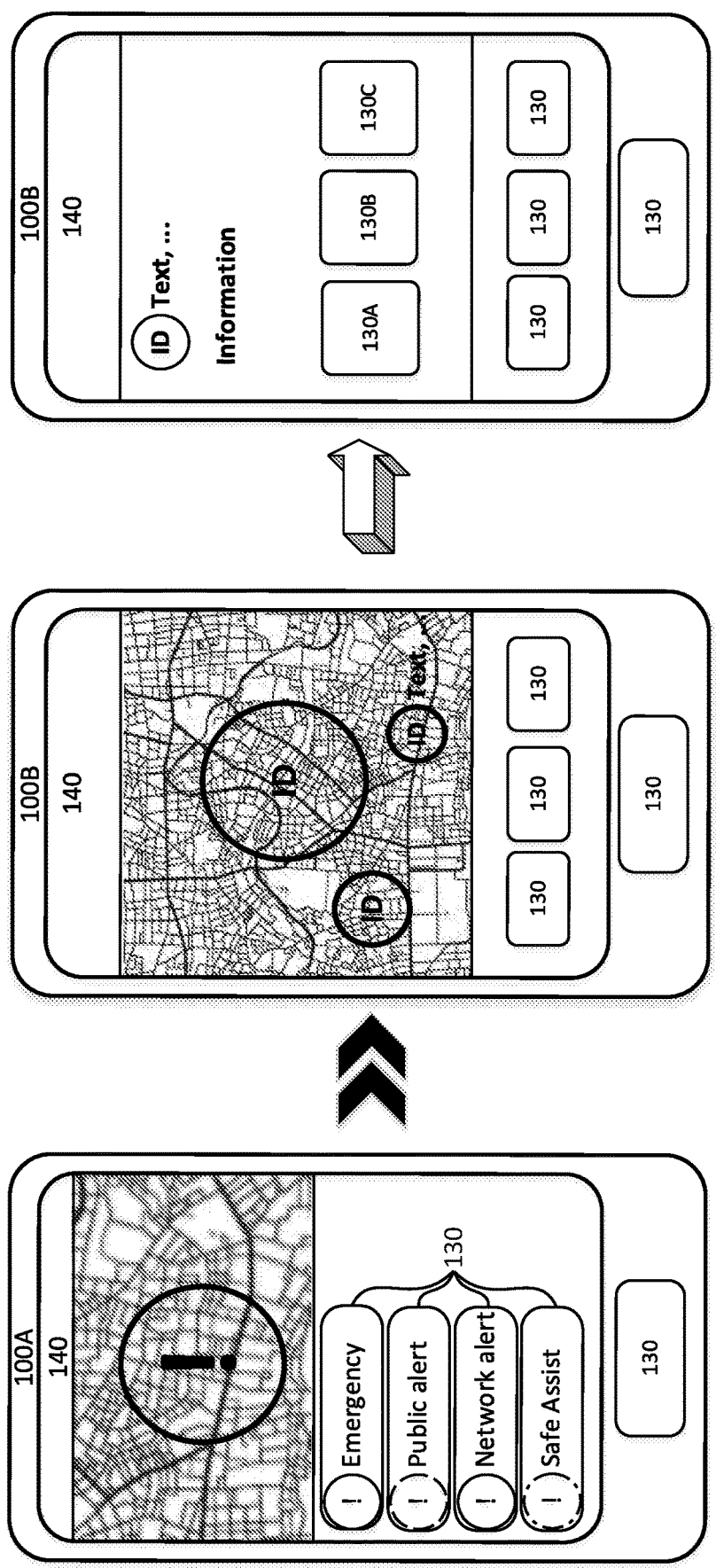
FIG. 8 shows an example view of a user interface of an application or software module comprising computer-readable instructions having been downloaded into and being executed by a controller of a user equipment, the computer-readable instructions enabling the user equipment to operate or function according to one embodiment of the present invention.

A received alert may be displayed as a textual notification in the notification view of FIG. 5. A received alert may also or alternatively be displayed as a graphical notification in the map view of FIG. 6. A received alert may also or alternatively be displayed as a graphical alert and a textual alert in the combined view of FIG. 7. Selecting the alert would bring up more information about the alert, such as current event, sender and so on. FIG. 8 shows the situation when a user of a UE 100A has entered an alert mode of the UE 100A. In such a mode, the current position of the UE 100A may displayed in a map view as part of the displayed content 140. A number of controls may also be displayed for providing a selection of an appropriate alert to be sent out. In the example of FIG. 8, four such controls 130 are shown, representing an emergency service being contacted, a public alert being transmitted, a network alert being transmitted (to an open or private group as per settings) and a safe assist to be requested. These are all examples of user alert actions that the UE can receive and execute on behalf of the user. A safe assist is a request that can be sent out when a user feels threatened or otherwise insecure, whereby another user may monitor or track the first user's movement making sure that nothing out of the ordinary happens, and if so, being able to send out a proper alert immediately on behalf of the assisted user.

The alert will be transmitted to and received by (as indicated by the double arrows) a second UE 100B, and the alert may be shown in a map view (as in the example of FIG. 8), and selected for further viewing. As can be seen, the alert may be shown indicating the originating location of the alert. In FIG. 8, the originating location is shown graphically by displaying the alert at the originating location in the map view of the displayed content 140. Selecting the alert may be done through use of the controls 130 or by actuating the displayed alert. As an alert is selected for displaying more information, a view of the alert is displayed showing an identifier for the poster and/or the current event (as indicated by the block arrow), the network association and other information regarding the current event such as the nature of the current event (fire alarm, assault alarm, medical emergency, traffic accident (crash), traffic emergency (flat tire) to mention a few), details about the sender (contact information, contact information to relatives, medical history possibly relevant to the event), to mention a few examples.

Some controls may be provided to take action on the alert, such as a control 130A for responding to the event (such as contacting the sender or contacting local authorities), a control 130B for forwarding the alert to network or contact that the receiver may deem competent to deal with the event, and/or a control 130C for opening any media or other information in attached content (video, photography, sound recording, to mention a few examples of attached content) associated with the alert. As can be seen in the example of FIG. 8, the alert may be displayed together with indications of nearby or overlapping networks, giving the receiver an idea of what networks are close at hand and might be able to offer further assistance.

Controls for indicating a false alarm, effectively negating the alert, or otherwise indicating a lack of trustworthiness of the alert or the sender may also be provided, especially to an administrator.

As one recipient accepts to take action on the event, a notification on this may be sent out to other recipients and to the sender so that it can be seen that the alert will be dealt with at least by one recipient.

To enable an administrator to increase the trustworthiness of posts being posted in the network, the administrator may allow (other) users to vote or rate a user's trustworthiness, by sorting the display of posts and/or notifications and possibly also the alerts based on a user's rating, or by requiring a rating score higher than a specific threshold value, untrustworthy users may be effectively sorted out or filtered. The filtering may be done at the administrator's end, only forwarding posts originating from a trustworthy source, or at the end point, a UE only displaying posts originating from a trustworthy source.

Referring back to FIG. 2 (and also to FIG. 3), in one embodiment a UE 100 (and/or a RD) is arranged with a cellular communication interface, such as an LTE and/or GSM interface. Even though the network system as disclosed herein has been discussed as being a network based on internet communication, it should be pointed out that in some embodiments and/or some circumstances, the communication may be effected through cellular communication, such as by sending a text message (Short Message Service; SMS) or making a (silent) GSM call, or by running a USSD (Unstructured Supplementary Service Data) code.

The safety alert network as disclosed herein is thus not to be considered to be restricted to internet protocol communication standards and the like, but may also rely (possibly only in part) on less advanced communication standards, such as SMS messaging.

An alert may thus be sent out as an SMS text message to a server or another UE which will then handle the alert as per usual. In one embodiment an SMS server is used to receive the message and then forward the message to a receiving UE. The message could be forwarded as an SMS message, or by utilizing another communication standard. Presumably the message would be transformed to an internet protocol message, such as an IP (Internet Protocol) message.

As indicated in the parenthesis, the same applies to both UEs and RDs.

The same may in some embodiments apply to other notifications, posts and other data to be transmitted. The network is thus not restricted to internet communication and data may be communicated in any manner suitable for the UE and/or circumstance or environment.

Examples of Usage

Personal Safety; Request and Provide Personal Assistance.

When a user encounters an emergency or an incident, besides calling local emergency number, the present invention could be used as an additional channel to expect quick assistance from the public. When the user sends out an emergency alert or public alert that describes the emergency or incident detail, and expected assistance, other users nearby who received the alert will understand the situation, and may be able to reach the user very quickly and provide immediately assistance.

Personal Safety; Effective Communication on Home Safety Incident.

With resource devices (more on these below) installed and configured at home, when a fire or burglary happens, even when no one is at home, a network alert would be automatically sent to the family network, together with video recordings. Every family member will be aware of the incident and have effective communication about how to handle it. The alert could also be shared to the community network so the neighbours will be aware of the incident and may provide necessary help.

Personal Safety; Effective Communication During Safety Crisis.

When an emergency or incident happened nearby user, but the user is not directly affected, the user could send out a network notification to the user's family network and friends' networks, so they know he is safe at first time.

Corporate Safety; Business Security Alarm

For certain businesses which are vulnerable to security incidents, such as retail stores facing robbery risk, if an incident happens, the staff could simply press the panic button in UE adapted according to the present invention, or press a wireless panic button on a resource device adapted according to the present invention, then a network alert with predefined content would be sent to security network of the company, enabling the security department to take immediate action. Alternatively or additionally, the alert may automatically activate a security camera adapted according to the present invention to start a video recording and allow live streaming by the security department.

Corporate Safety; Effective Communication During Office Safety Crisis.

When a safety crisis has happened in the office, an HR manager or security manager could utilize a confirmed network notification or alert to make sure every employee is safe. For example, when a traditional fire alarm is activated in the building and the entire office needs to evacuate, the HR manager could send out a confirmed network notification to the company network to ask every employee to confirm they have been evacuated and are safe. When employees receive the notification, they can confirm they that have evacuated and are safe, or they that they are not in the office today, but they are safe. Very quickly, the HR manager could find out whether every employee is safe, or if there is someone that hasn't reported their safety and requires follow-up actions.

Social Security; Club or Group Emergencies.

The system as per the present invention may also be useful for less dramatic emergencies or contingencies. If a network is formed for members of a club, for example a local fencing club, all network members could be notified or alerted as something happens in the fencing club. If a resource device is connected to the network for monitoring the power supply of a club locale, club members could be informed when a power outage happens in the club, whereby a nearby member may go to the club locale to inspect that all is in order until the power comes back on.

Roaming Networks

As should be clear all embodiments discussed in relation to the moving between networks applies to all embodiments discussed in other portions of this text.

Figure 9:
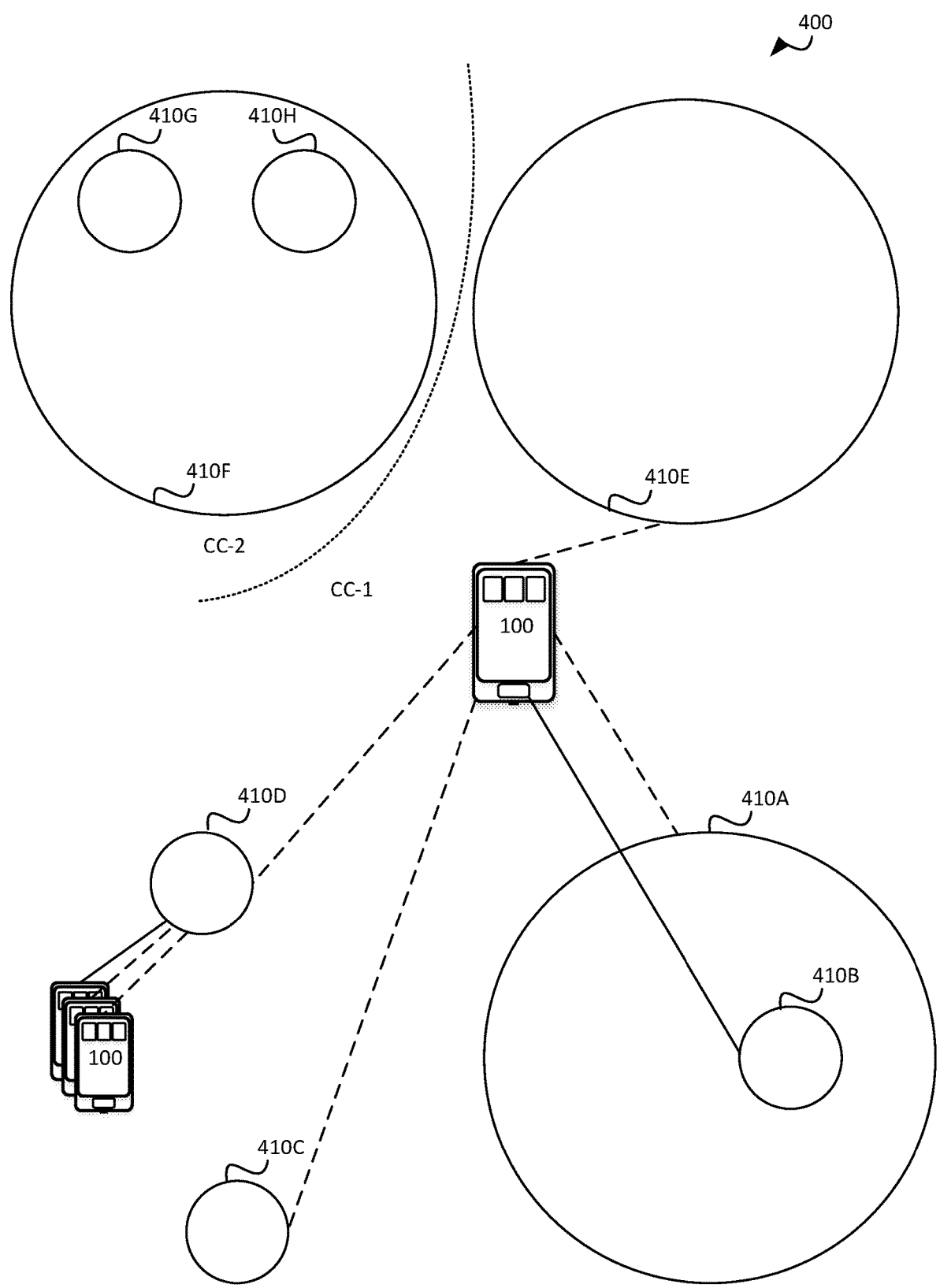
FIG. 9 shows a schematic view of an example safety alert network system according to one embodiment of the present invention.

As has been disclosed with reference to FIG. 4, a user may be member or at least allowed to receive posts of a network based on a locality of the user in comparison with the network. This enables for a user to roam networks as the user moves or travels. As indicated in FIG. 9, showing a schematic view of a safety alert network system 400 as per the present invention, a user may still be a member of networks even when the user no longer shares a common locality with the network, as is indicated by the UE 100 having been removed from the networks 410A and 410B. This is indicative of a regular member to the network. Of course, an administrator of a network would always be a member of the network, regardless of locality.

However, as has also been discussed in relation to FIG. 4, a user may become a member (or at least allowed to receive posts) of a network by simply entering the locality of the network. As discussed in relation to FIG. 4, the locality may be compared based on coordinates and/or based on area codes.

Figure 10:
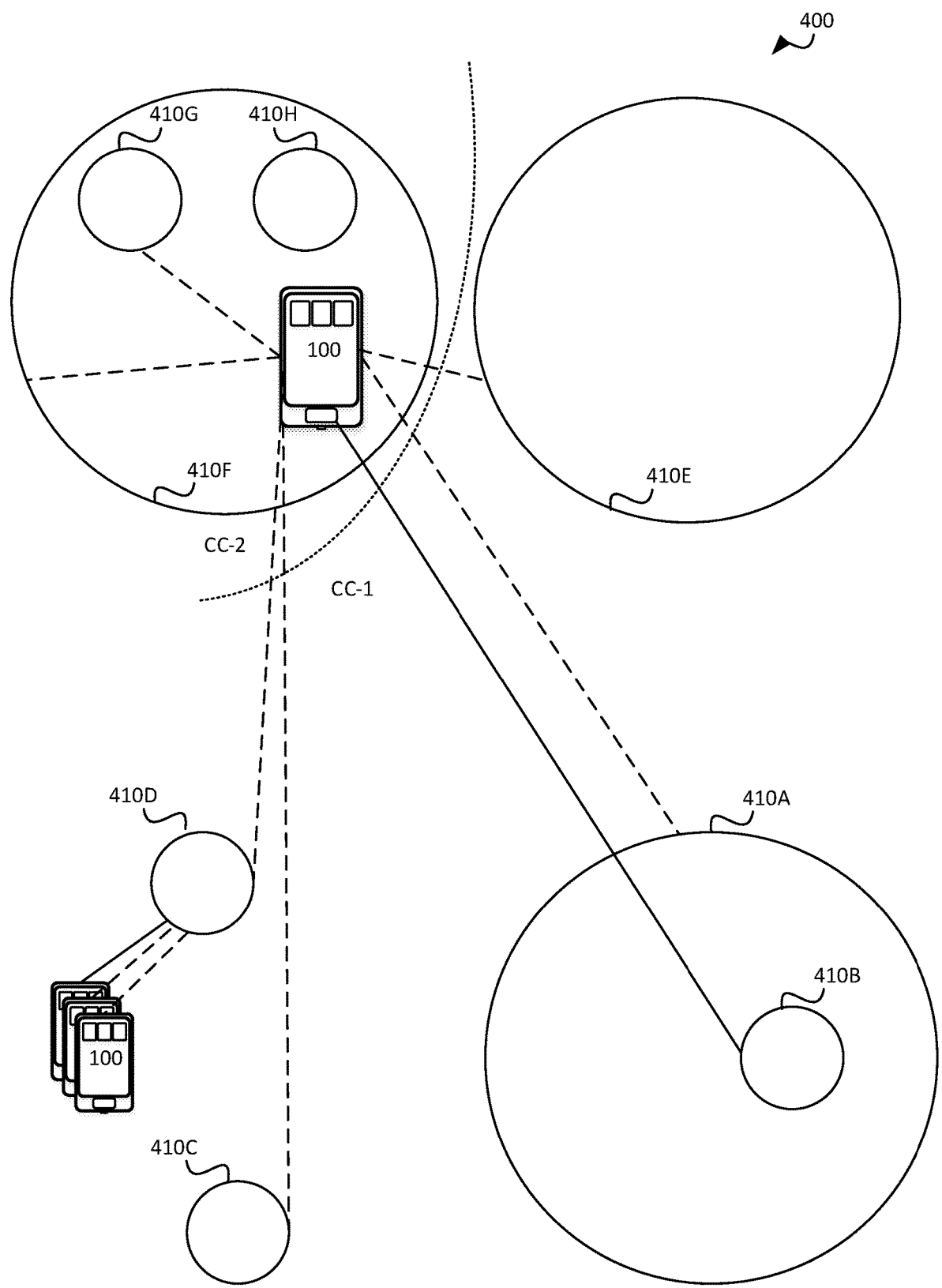
FIG. 10 shows a schematic view of an example safety alert network system according to one embodiment of the present invention.

FIG. 9 indicates that the networks 410F, 410G and 410H are in an area having a different country code (or other code) than the networks 410A-410E, having the code CC-1, whilst networks 410F-H having the code CC-2. As seen in FIG. 10, showing a schematic view of a safety alert network system 400 as per the present invention, as a UE 100 is moved to an area having a different area code (CC-2 vs CC-1) or when the locality of the UE 100 corresponds with the locality of a network, the UE 100 maybe granted membership, either automatically or after approval, depending on administrator settings. A membership that is only valid while a locality is shared, may be termed a visiting membership.

As can be seen in FIG. 10, showing a schematic view of a safety alert network system 400 as per the present invention, the UE may become a member of new networks 410F and 410 G as the UE enters the new area. For example, if the network 410F is a public network for the city of London, United Kingdom, the user may be granted automatic visiting membership rights (presumably being restricted to reading posts) upon entering the area of the network (as determined by physical locations and/or area codes). During the user's stay in London, the user may become aware of new networks, perhaps by joining a club, or by a network showing up on the map view as discussed in FIG. 6, and request to join those networks as well, by sending an explicit request which is approved by the administrator. For example, the user may want to join a local neighbourhood watch of a neighbourhood of a friend or relative and requests membership to the network 410G.

In an embodiment, where the UE stores an indicator of a language being used to display the content 140, a network and/or any posts made in the network may be associated with language settings indicating the language of the network and/or possibly of individual posts. The language settings may be explicit as in being stated in the settings, or implicit as being determined through semantic analysis of posts/information in the network.

In such an embodiment, when a post, notification or other information of a network is received, the language indicator of the received information may be compared by the controller to the language indicator of the UE 100. If they differ, automated translation may be provided to ensure that the receiver is able to partake of the important information being received. As the information is almost of a safety/security nature, it is important for a receiver to be able to partake of the information, regardless of language abilities. The translation may be automated or through the actuation of a control 130.

In one embodiment, the user is enabled through the UE 100 being configured to issue alerts in a network that the UE 100 is (temporarily) sharing a locality with. In one embodiment the user is alternatively or additionally the user is enabled through the UE 100 being configured to receive alerts in a network that the UE 100 is (temporarily) sharing a locality with.

As will be discussed more in detail below with relation to resource devices, in one embodiment the user is alternatively or additionally enabled through the UE 100 being configured to share resources in a network that the UE 100 is (temporarily) sharing a locality with.

This allows a (travelling) user to receive and/or issue alerts, and possibly also notifications and posts etc in a (visited) network enabling the user to take full advantage, and also partake in and contribute to the safety and security aspects offered by the (visited) network. Returning to the example of the user travelling to London, U.K. as the user enters the networks of London, and if the UE 100 is indicated to share alerts, the user is enabled to issue and/or receive alerts whilst being in London. The user is thus part of a safety alert network system even when travelling, able to send out alerts, be tracked, receive assistance as well as respond to alerts, track someone, and offer assistance.

Figure 11:
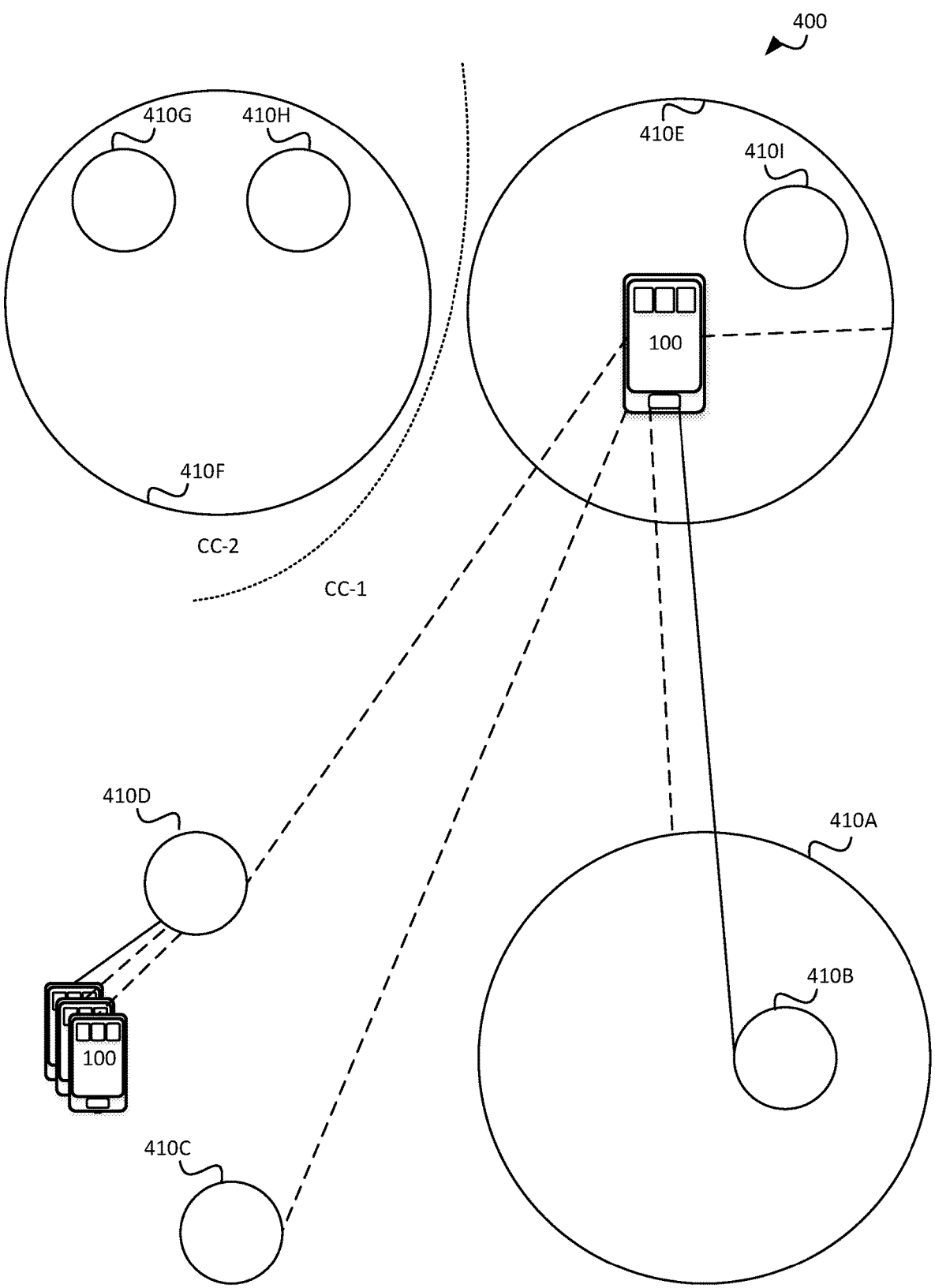
FIG. 11 shows a schematic view of an example safety alert network system according to one embodiment of the present invention.

Continuing with the example of the travelling user, as the user leaves the locality of the network 410F, the user also loses any visiting memberships (in other words, all memberships solely based on a shared locality). As seen in FIG. 11, showing a schematic view of a safety alert network system 400 as per the present invention, as the UE 100 is moved out of the locality of network 410F, the UE 100 also lose the membership of that network (as is indicated by the removal of the dashed line connecting the UE 100 and the network 410F). The same may apply to the private network 410G (the local neighbourhood watch of a neighbourhood of a friend or relative) or the UE may retain the membership, depending on what membership was granted initially (or later).

In the example of FIG. 11, the user has travelled to a different locality, say Helsingborg, Sweden, and is now in a shared locality with the public network 410E. Already being a member, no new membership with this network is formed, but based on the new locality of the UE 100, the additional networks (network 4101) may now be visible to the user, perhaps as being displayed in the graphic map view as shown in FIG. 6.

Figure 12:
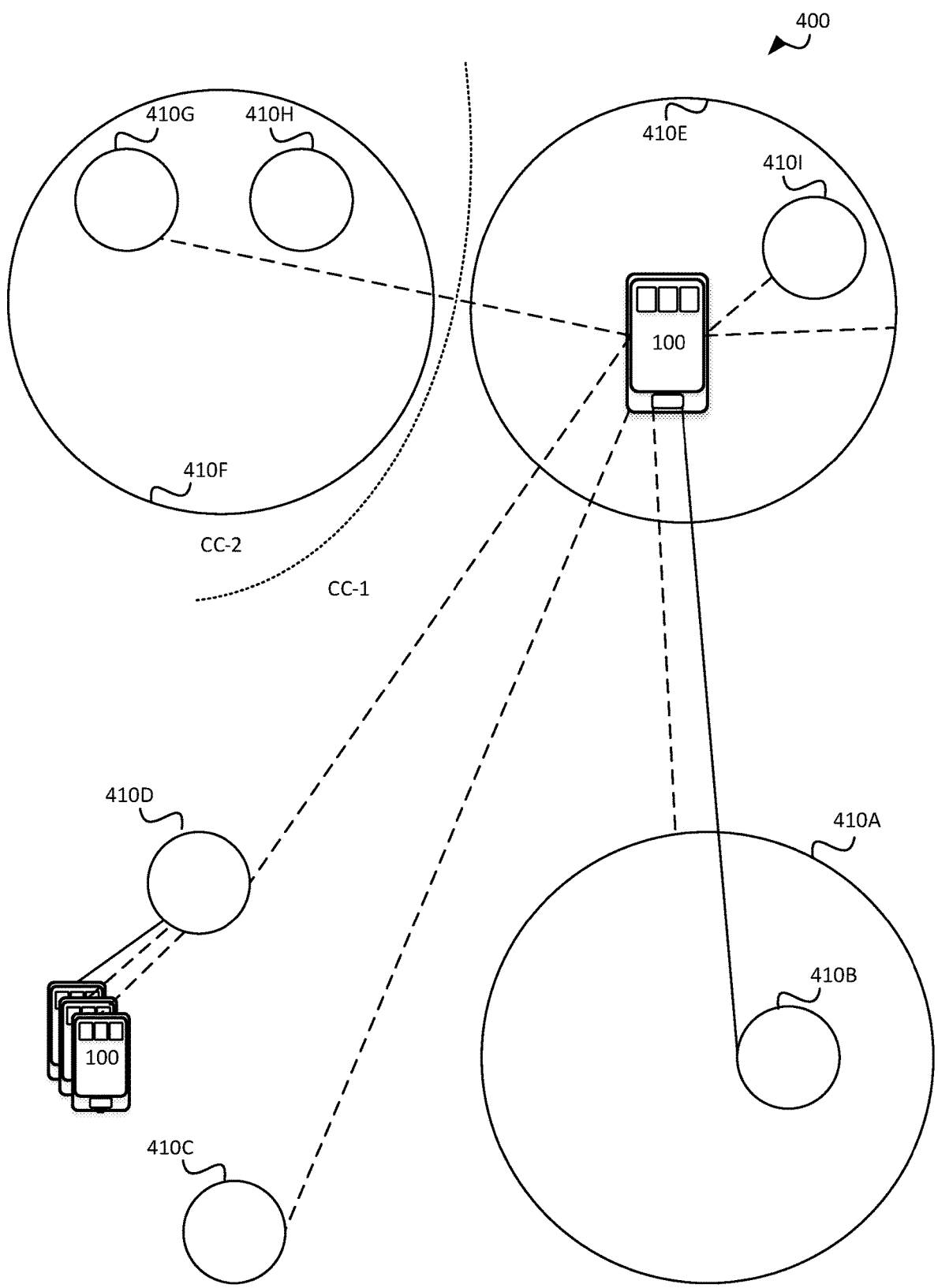
FIG. 12 shows a schematic view of an example safety alert network system according to one embodiment of the present invention.

As seen in FIG. 12, showing a schematic view of a safety alert network system 400 as per the present invention, the user may now request membership also in the network 4101. The user may also request a membership not based on locality with the network 410G of London, United Kingdom. The new memberships are shown as dashed lines in FIG. 12.

Resources in Networks

As should be clear, all embodiments discussed in relation to the use of resources of a network applies to all embodiments discussed in other portions of this text.

Figure 13:
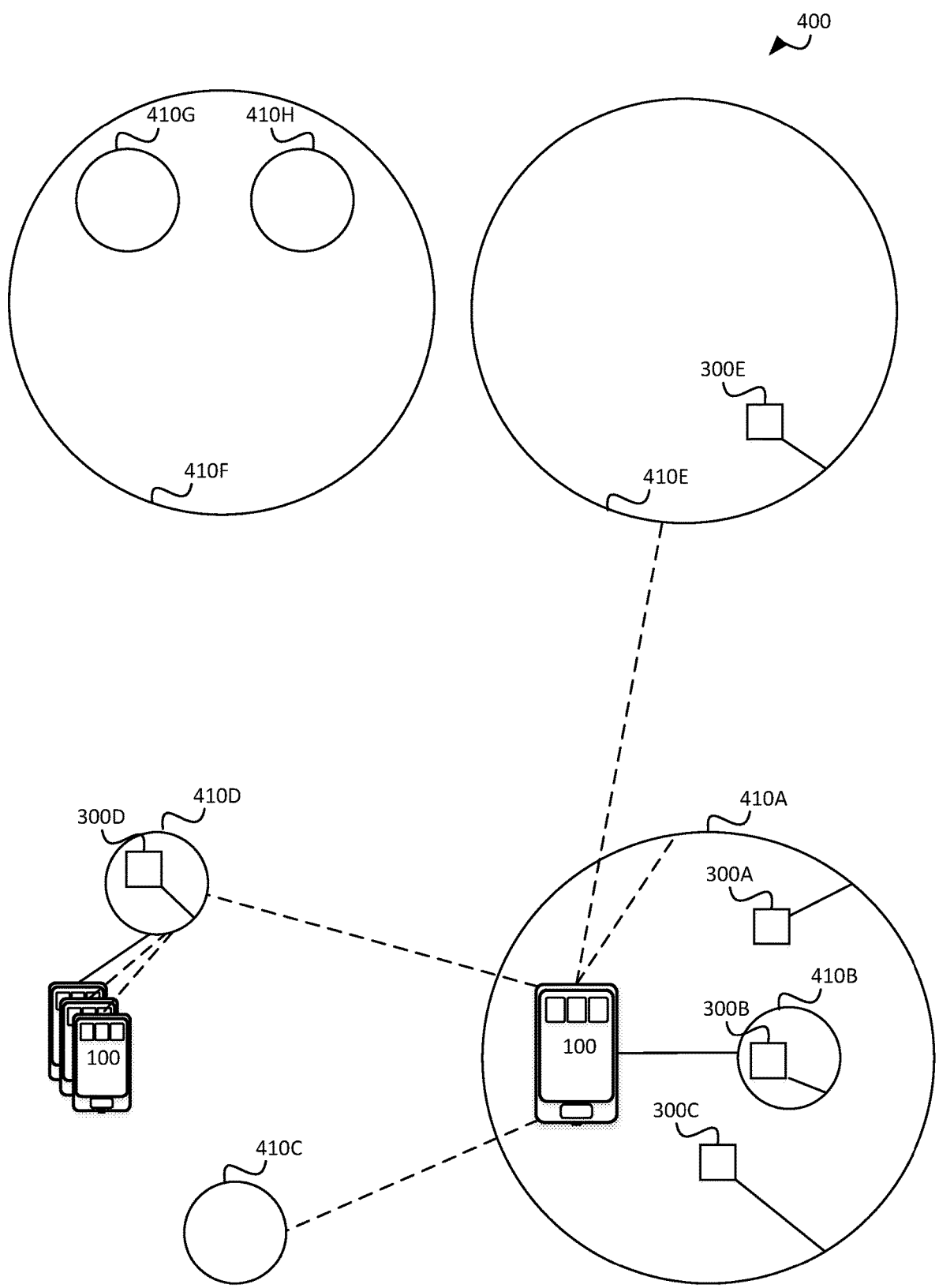
FIG. 13 shows a schematic view of an example safety alert network system according to one embodiment of the present invention.

As discussed in relation to FIGS. 2 and 3, a UE 100 may be arranged to communicate with one or more resource devices (RDs). The resource devices may be associated with a network and connected to an administrator's UE, either directly or indirectly enabling the administrator some control of the resource device. In FIG. 13, showing a schematic view of a safety alert network system 400 as per the present invention, resource devices 300 are shown as square boxes and being associated with networks as shown through connecting lines. Although most networks in FIG. 13 are shown as having one resource device 300, it is also indicated that a network may be without resources (such as network 410C) or be associated with several resources (such as network 410A having two resources 300A and 300C). It should thus be clear that any network may be associated with zero, one or several resource devices.

As discussed in relation to FIG. 3, resource devices 300 may be active or passive devices, or both, such as a fire alarm, both being able to detect a fire and to sound an alarm possibly activating sprinklers. Examples of passive and active devices are given above with reference to FIG. 3.

Associating resource devices (RDs) 300 with networks enables for automated alarming in a network. Similar to home safety, with safety resource devices installed and configured in for example an office, as a fire or burglary happened, a network alert would be automatically sent to administrators of the company network. Then the administrators could communicate with each other and decide whether the alert should be shared with all the network members, and inform them not to come to the office until further notice.

Associating resource devices (RDs) 300 with networks also enables for sharing the RD 300 between the members of the network.

In one embodiment a resource device 300 may be associated with a network, by being a member of that network, hereafter referred to as a resource device member (RD member). In one such embodiment, the data provided by the RD member could be implemented as posts or notifications being posted by the RD member.

Registering a resource device as a member, diffuses the differences between the UE 100 of FIG. 2 and the RD 300 of FIG. 3, which should be taken to be understood as that a resource device may also be implemented or be a UE 100.

An RD member could then also be used for setting up a resource specific network. In one embodiment, a resource may be seen as a composite resource, namely a resource having further resources, or a group of resources.

One such example is a car (or other vehicle), wherein the car may be registered as a member. It may be noted that since many modern cars are equipped with communicative abilities, controller(s), memory and user interface(s), it may in fact be regarded as a User Equipment as in FIGS. 1A-D and 2. A network may then be set up for the car, enabling other members to share or partake in the events of the car. It also enables a driver of the car to respond to alerts while driving the car (or at least being in the vicinity of the car). Any alarm device of the car may then also be shared, either as a resource device associated with the car or as a post/alert generator of the car (the car acting as a UE).

Figure 14:
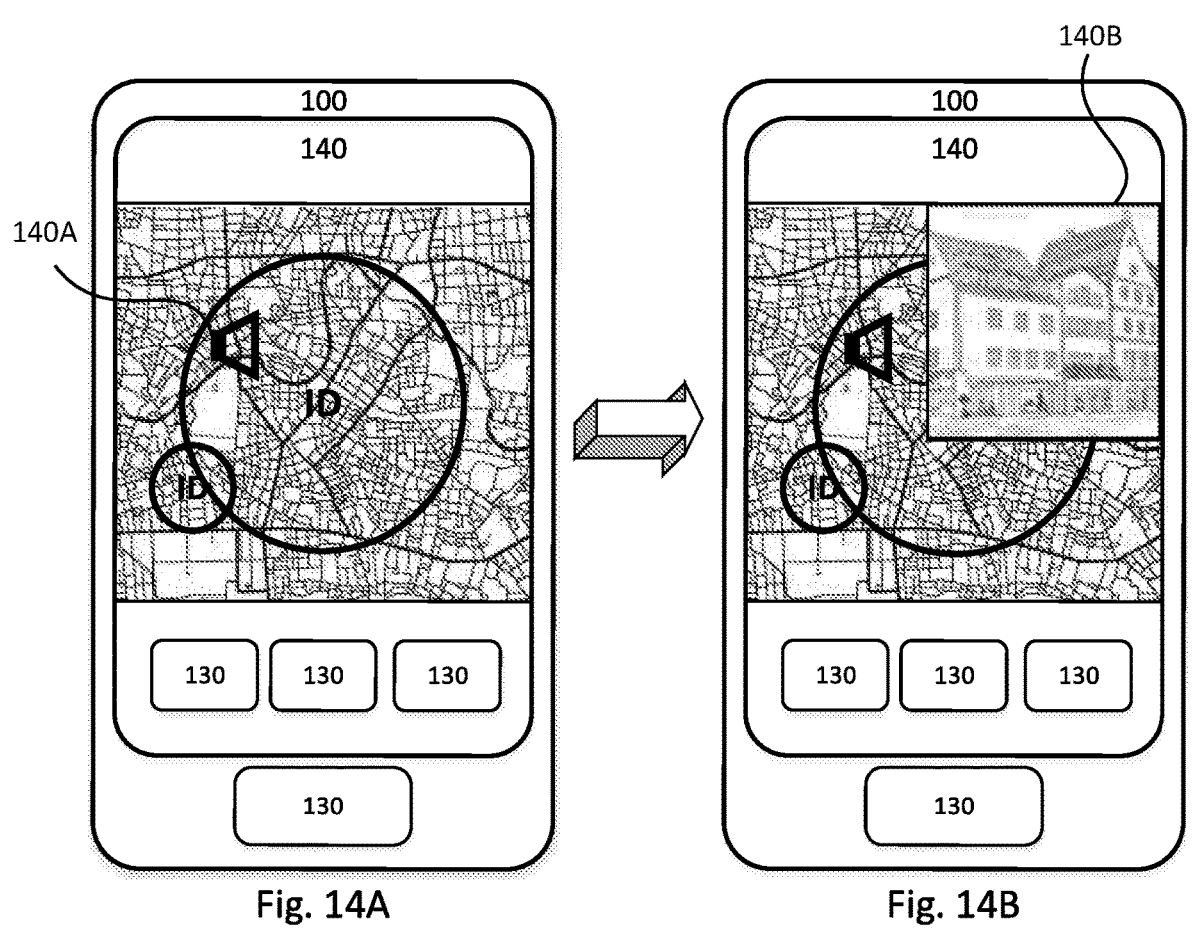
FIG. 14A shows an example view of an instance of a user interface of an application or software module comprising computer-readable instructions having been downloaded into and being executed by a controller (101) of a UE 100, the computer-readable instructions enabling the UE to operate or function according to the present invention.
FIG. 14B shows an example view of an instance of a user interface of an application or software module comprising computer-readable instructions having been downloaded into and being executed by a controller (101) of a UE 100, the computer-readable instructions enabling the UE to operate or function according to the present invention.

FIGS. 14A and 14B each shows an example view of an instance of a user interface of an application or software module comprising computer-readable instructions having been downloaded into and being executed by a controller (101) of a UE 100, the computer-readable instructions enabling the UE to operate or function according to the present invention.

A RD 300 may be displayed as part of the displayed content, or rather a graphical and/or textual indication of a RD 300 may be displayed as part of the displayed content. FIG. 14A shows a UE 100, wherein a map view is displayed. An indicator 140A for a RD 300 is shown inside a network, indicating that the RD 300 is associated with the network. Showing an association of a RD 300 and a network may be done in different ways, for example through graphic connectors, similar colours, textual labelling, or other symbolic connections.

Similar to giving access rights to posting (read/write/comment/rate), a member may be given access rights to RDs 300. The access rights may be given by the administrator upon registering the membership or later dependent on settings and desires. The access rights may include (but not limited to) receiving data and controlling the RD 300. For a passive resource, receiving rights includes to receive data (such as sensor readings) from the RD 300, and controlling rights includes to control the operation of the RD, such as changing an angle or tilt, indicating a measurement range, and/or even turn on/turn off.

For a passive resource, receiving rights includes to receive data (such as status) from the RD 300 and sharing the data, and controlling rights includes to control the operation of the RD, such as changing an angle or tilt, indicating a measurement range, activating a feature of the RD 300, and/or even turn on/turn off. For RDs 300 that are both passive and active, access rights may include a combination of all or at least some of the rights mentioned above.

As an example, a camera device may be shared to provide members with a live feed of what is in front of the camera. Controlling rights enable a member to move the camera as regards the angle/tilt, choosing to track an object, perform facial recognition or other recognition application to mention a few available camera applications.

As another example, a lock device may be shared to provide members with possibilities to check whether a door (or other closing means) is locked or unlocked, to enable a member to lock/unlock the lock, or to sound an alarm if a catastrophic error is indicated, such as a forced or broken lock.

Returning to FIG. 14A, a user may thus be able to identify a RD 300 in the map view of the UE 100, which in this example is indicated to be a camera resource by a graphical indicator 140A. Selecting the RD, possibly by selecting the graphical indicator, allows for providing additional data regarding the RD. As seen in FIG. 14B, a view 140B of a live feed of the camera is displayed as part of the displayed content 140, partially overlapping the map view. As a skilled person would understand, the manner of displaying information and/or controls for a RD 300 may be implemented in a variety of manners, all depending on the user interface style of the UE 100, the character or nature of the RD and the access rights available and given for the RD. Going in to all details would place an undue burden on the reader of this application, and the present application will thus suffice in stating that data and/or controls for a selected RD may be provided to a user through the UE 100, and especially through the displayed content of the UE 100. A sound recording may for example be played through loudspeakers (not shown) of a UE, giving an example of how data may be provided outside the displayed content.

A member may thus be provide with indicators of a network's resources and be able to share in the operation of and/or data provided by the RD 300. Given controls 130 to share the content received by a resource Returning to the example of the travelling UE 100 as discussed with relation to FIGS. 9, 10, 11 and 12 as applied to the system 400 including RDs 300 of FIG. 13.

As the UE 100 is in the starting location being member of the public network 410A and the private network 410B and also being a member of the networks 410C and 410D, the UE 100 enables a user to take part in sharing the RDs 300A and 300C through the membership of network 410A (having reading rights, the network being a public network), the RD 300B through the membership of network 410B (having controlling rights being the administrator), the RD 300D through the membership of network 410D (having reading rights being a regular member) and the RD 300E through the membership of network 410E (having reading rights, the network being a public network). The user may thus be able to even share in public RDs from the public network of Helsingborg, without even being close to Helsingborg, nor being a citizen. And furthermore, depending on settings, live feeds from cameras in Helsingborg (network 410E) may even come up in the live feed of notifications and posts of the UE 100, as displayed in FIG. 5 this also enables the user to share the live feed further with other networks the user is a member of.

Figure 15:
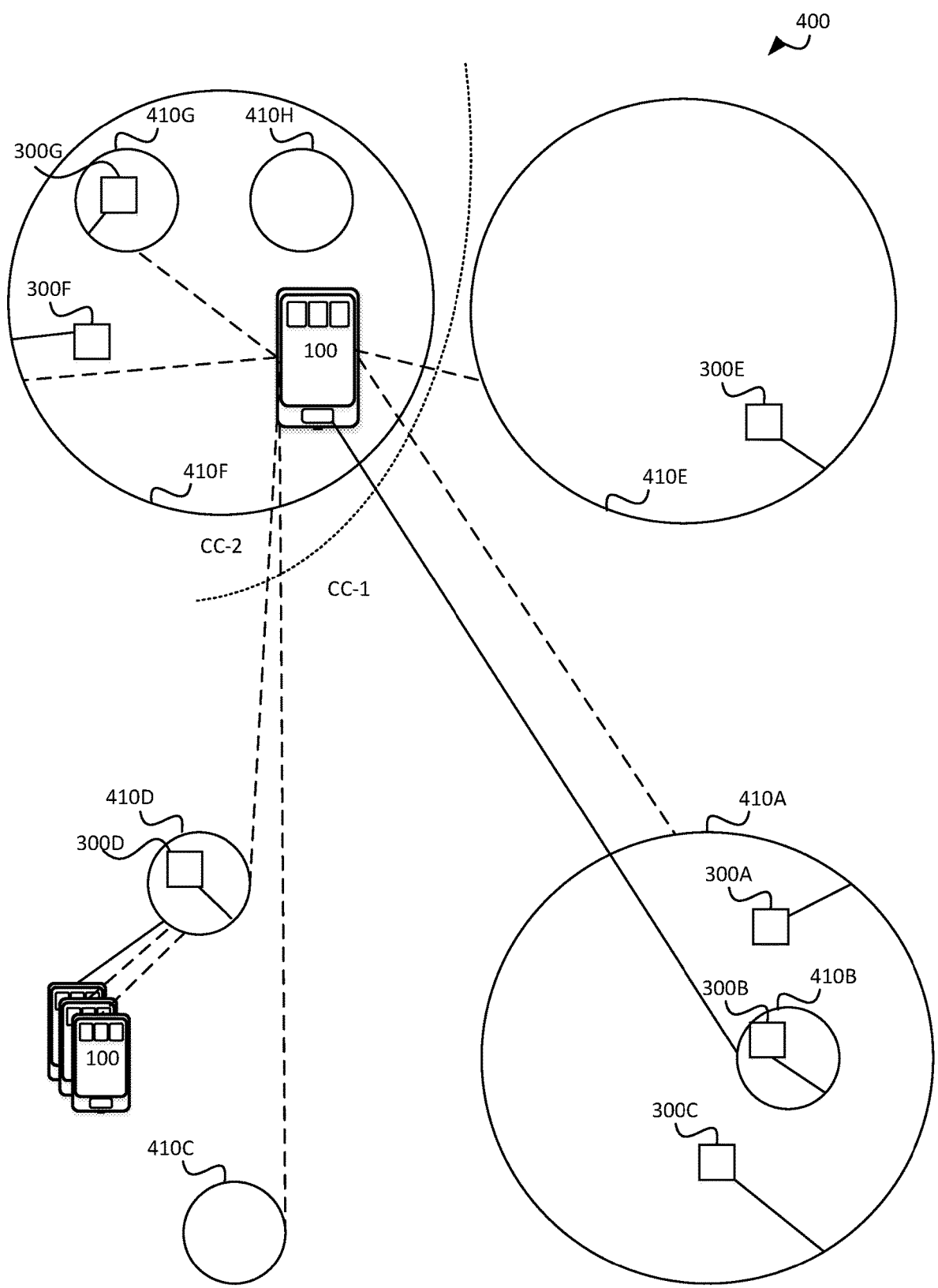
FIG. 15 shows a schematic view of an example safety alert network system according to one embodiment of the present invention.
Figure 16:
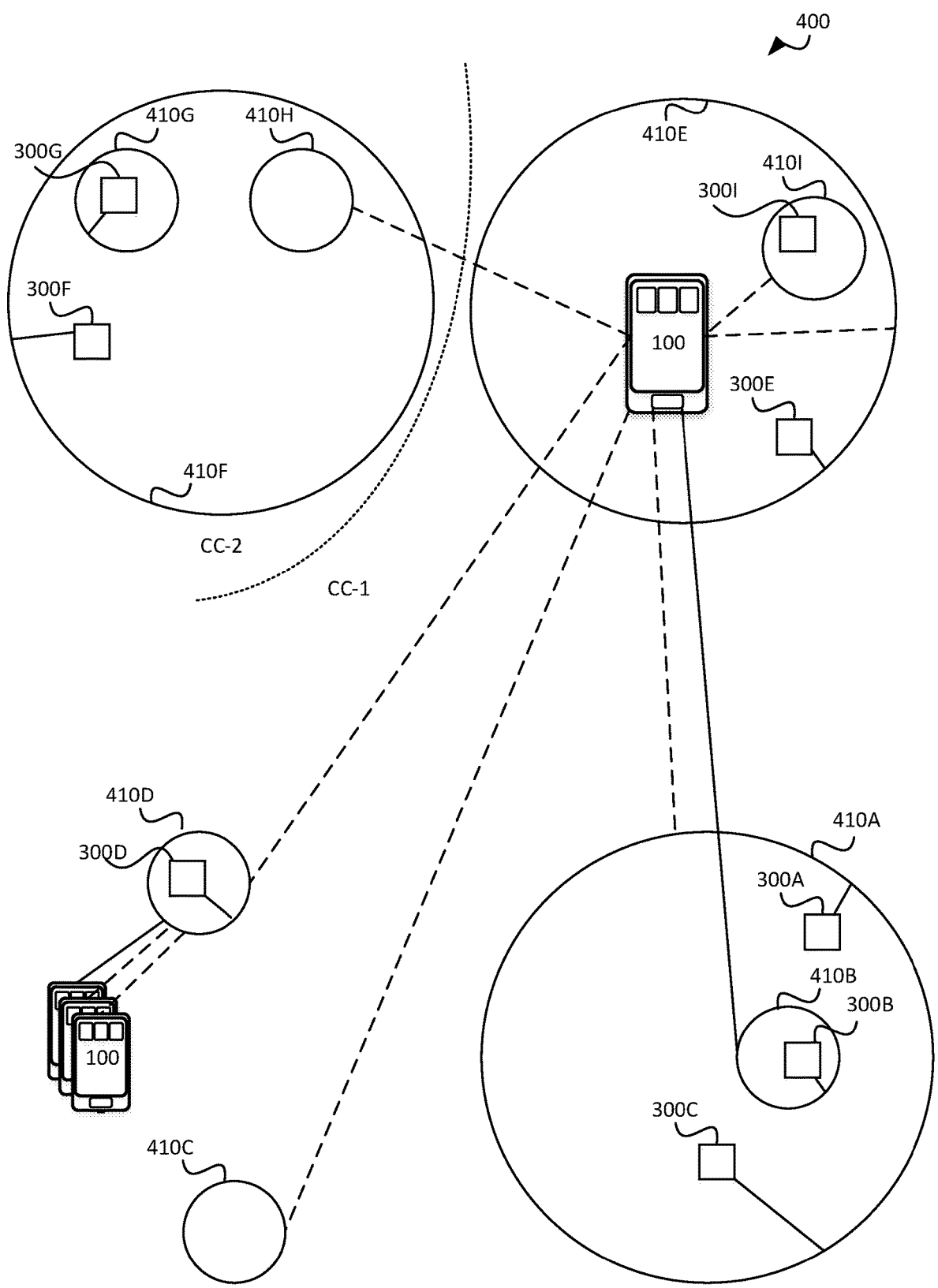
FIG. 16 shows a schematic view of an example safety alert network system according to one embodiment of the present invention.

Similar to FIG. 11, FIG. 15 (showing a schematic view of a safety alert network system 400 as per the present invention) shows that as the UE 100 has entered the locality of network 410F and become a member of network 410G, the user of the UE 100 is now also able to take part in the sharing of RDs 300F and 300G. Also FIG. 16 (showing a schematic view of a safety alert network system 400 as per the present invention), similar to FIG. 12, shows that as the UE 100 enters the locality of network 400E and also becomes a member of the network 4101, the UE may be enabled to take part in sharing of RD 3001 of the network 4101.

Thus, by a UE 100 entering or otherwise becoming a member of a network, the member may also be giving access rights to RDs 300 of the network, thus being able to fully take part of all safety related information available (as per access rights) in the network.

Through the simple installation of an application or software module carrying computer-readable instructions in a UE 100, a user may thus be enabled to take part in a great variety of safety-related information and content, both local and remote, and both from public organisations as well as other vigilant users. As the UE 100 is also enabled, as shown in FIG. 8, to send out posts, notifications, alerts, and/or contact an emergency service based on the information received, and possibly also basing the notifications, posts, alerts or emergency contacting on the received content, a single user is able to operate an alarm center, thereby enabling the public to play a greater role in a society's security and also enabling for a much greater coverage of and faster response to various events, crises and accidents.

Figure 17:
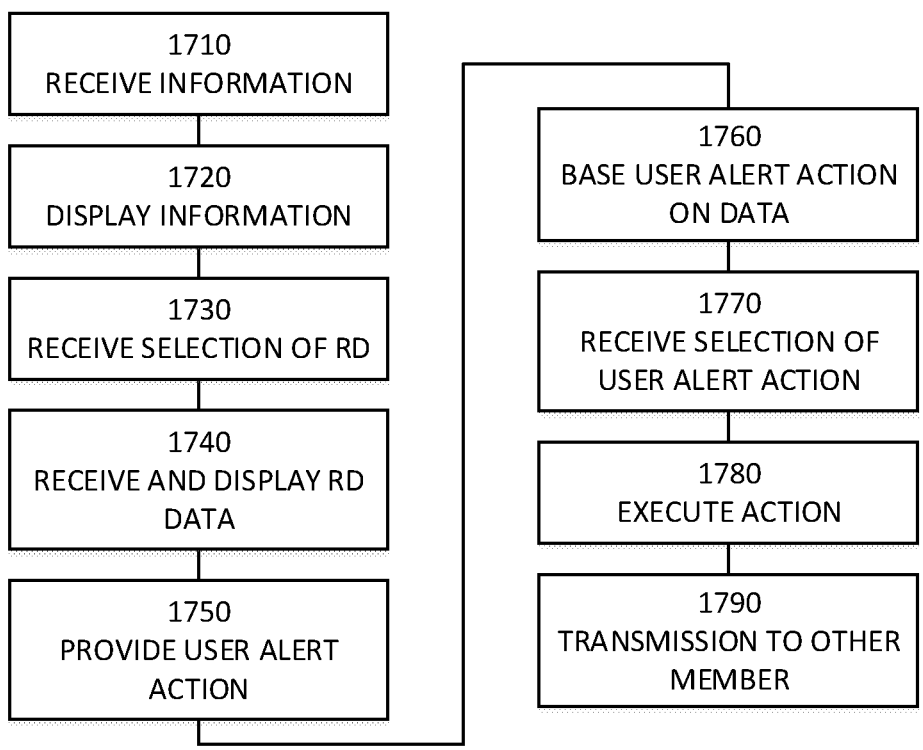
FIG. 17 shows a corresponding flowchart for a method according to an example embodiment of the present invention.

FIG. 17 shows a schematic flowchart of a general method implementing the teachings of the present invention. The method is for providing a safety alert in a network system 400 as in FIG. 4. A UE 100 receives 1710 safety-related information associated with a network 410, and displays 1720 the safety-related information. The UE 100 also receives 1730 a selection of a RD 300 associated with the network 400 and in response thereto receiving 1740 data from the RD 300 and displaying the data of the RD 300. The UE 100 provides 1750 a selection of at least one user alert action, wherein at least one user alert action is based 1760 on the received data of the RD 300 enabling a user to select a user alert action and the UE receives 1770 a selection of a user alert action and executes 1780 the user alert action through a transmission 1790 to at least one other member of the network.

Figure 18:
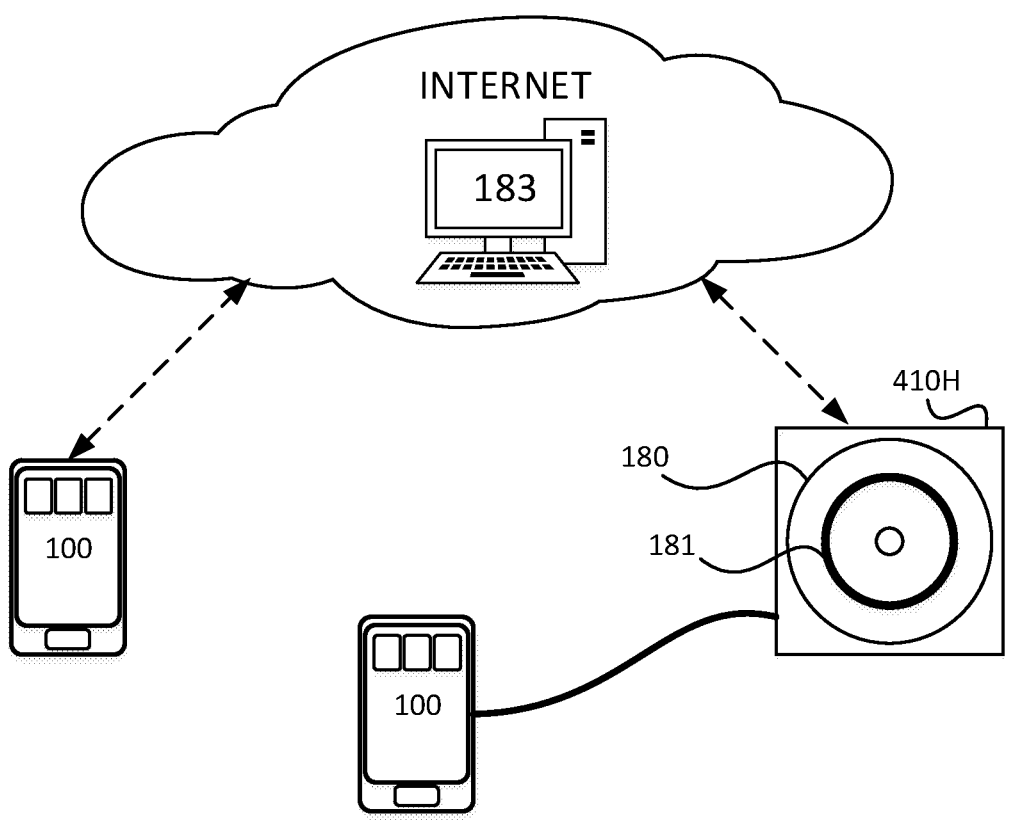
FIG. 18 shows a schematic view of a computer-readable medium carrying computer instructions that when loaded into and executed by a controller of a UE enables the UE to implement an embodiment of the present invention.

FIG. 18 shows a schematic view of a computer-readable medium 180 carrying computer instructions 181 that when loaded into and executed by a controller of a UE 100 enables the UE 100 to implement the present invention.

The computer-readable medium 180 may be tangible such as a hard drive or a flash memory, for example a USB memory stick or a cloud server. Alternatively, the computer-readable medium 180 may be intangible such as a signal carrying the computer instructions enabling the computer instructions to be downloaded through a network connection, such as an internet connection.

In the example of FIG. 18, a computer-readable medium 180 is shown as being a computer disc 180 carrying computer-readable computer instructions 181, being inserted in a computer disc reader 182. The computer disc reader 182 may be part of a cloud server 183—or other server—or the computer disc reader may be connected to a cloud server 183—or other server. The cloud server 183 may be part of the internet or at least connected to the internet.

The computer disc reader 182 may also or alternatively be connected to (or possibly inserted into) a UE 100 for transferring the computer-readable computer instructions 181 to a controller of the UE (presumably via a memory of the UE 100).

FIG. 18 shows both the situation when a UE 100 receives the computer-readable computer instructions 181 via an internet connection and the situation when another UE 100 receives the computer-readable computer instructions 181 through a wired interface. This enables for computer-readable computer instructions 181 being downloaded into a UE 100 thereby enabling the UE 100 to operate according to and implement the invention as disclosed herein.

Figure 19:
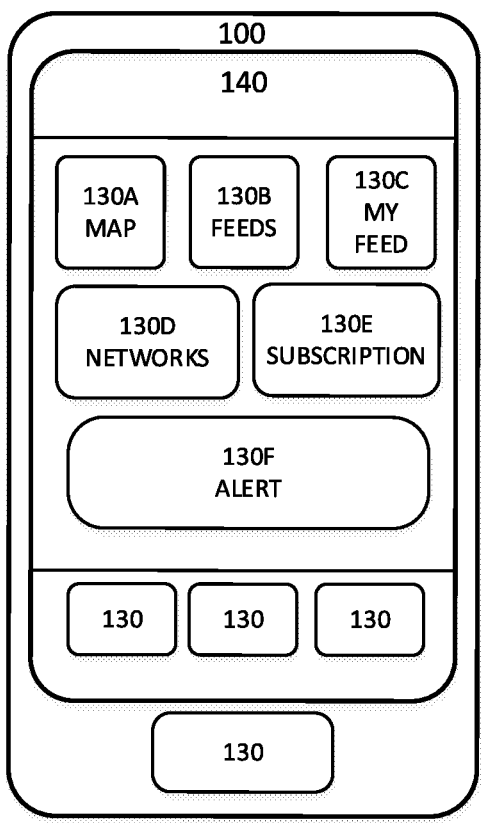
FIG. 19 shows an example view of a user interface of an application or software module comprising computer-readable instructions having been downloaded into and being executed by a controller of a user equipment, the computer-readable instructions enabling the user equipment to operate or function according to one embodiment of the present invention.

FIG. 19 shows an example view of a user interface of an application or software module comprising computer-readable instructions having been downloaded into and being executed by a controller (101) of a UE 100, the computer-readable instructions enabling the UE to operate or function according to the present invention.

FIG. 19 shows an example view of how various functions of an alert network system may be presented to a user through various user controls 130. It should be noted that the exact manner, and exactly which functions are available and/or presented may differ greatly between implementations and that the example of FIG. 19 is just on out of many possibilities.

In the example of FIG. 19, there is shown a user control 130A for presenting a map view which enables a user to switch to a map view of available networks (and possibly resources). The map view may be accompanied by a smaller feed view. Examples of such views are shown in FIGS. 6 and 7.

In the example of FIG. 19, there is shown a user control 130B for presenting public feeds, that is feeds of posts form public (and/or other networks) which enables a user to switch to a feed view of available networks (and possibly resources), enabling the user to partake in information posted through the networks. An example of such a view is shown in FIG. 5.

In the example of FIG. 19, there is shown a user control 130c for presenting feeds associated with the user, that is feeds of posts from or made by the user (and/or in networks which the user is an administrator of) which enables a user to switch to a feed view, enabling the user to partake in information posted through the user's networks. An example of such a view is shown in FIG. 5.

In the example of FIG. 19, there is shown a user control 130D for presenting networks. The networks presented may be all available networks, locally available networks, networks that the user is a member of, networks that the user is administrator of. Through such a view, the user may select a network and change settings related to the network. For example, a user may request other access rights. A user may request a member ship, a user may change rights for another user, end so on to mention a few examples.

In the example of FIG. 19, there is shown a user control 130E for presenting subscription information. The subscription information may also or alternatively include settings for various networks. By changing the user's subscription, a user my then also be entitled to further access rights, which may then be changed also through the subscription view. The subscription may be free or it may be charged. The subscription may also or alternatively be available in different levels, each level giving further rights.

In the example of FIG. 19, there is shown a user control 130F for generating an alert, as discussed in relation to FIG. 8.

The view may also comprise further options as is the case in the example of FIG. 19.

Returning to the subscription settings and the usage of a safety alert network system as detailed herein in general, a few aspects of a safety alert network system as detailed herein will be exemplified further below. It should be noted that these examples build on and are applicable to multiple combinations of embodiments as discussed in the above.

The safety alert network system as detailed herein enables a user to feel safe, which should be a human right, by allowing the user to set up an alert or alarm central in an open community by being a member of and/or initiating (setting up) public, open and private networks. A public network may be a network administered by a public office. An open network may be a network administered by a company and which is open to all. A private network may be a network administered by a private person or company and which is only open to members. Different networks may be set up to implement different functions. As examples one open network may be set up for a school enabling all to help in keeping the school safe and a private network may be set up for a car, enabling the car and his family and friends in keeping the car safe.

The safety alert network system as detailed herein enables a user to follow or take part of global as well as local events, both of a public nature and a private nature.

The safety alert network system as detailed herein enables a user to send alerts and notifications to a general public or to members of chosen networks. The user may thus issue an alert appropriate to a situation. The alert and/or notifications may be customized through settings, with regards to the recipients, type of notification/alert and content of the notification/alert.

The safety alert network system as detailed herein enables for sharing of resources, so that existing monitoring and alarm systems may be shared through the safety alert network system as detailed herein.

The safety alert network system as detailed herein is useful for personal use, for creating a neighbourhood community, sharing ones position with family and friends and partake in global and local information.

The safety alert network system as detailed herein is useful for residential or neighbourhood use, sharing events in different estates, sharing monitoring functions and in general increase the security of the neighbourhood, possibly also sharing events with service providers so that an electric company may be notified as soon as a power outage occurs.

The safety alert network system as detailed herein is useful for communal use, for providing information and sharing events in a commune.

The safety alert network system as detailed herein may be available as a subscription. The subscription may be available in different levels, the most basic being a free license allowing a user to partake in public information. A higher level may enable a user to share in open networks. A higher level may alternatively or additionally enable a user to set up one or more networks, private, open and/or public. The subscription level may indicate how many networks that may be set up and/or administered, the types of networks being set up and/or administered. The subscription may also or alternatively indicate what settings are available to a user. The subscription may also or alternatively indicate how many and/or the type of resources that may be administered by a user.

A subscription is specific to a user, and is in one embodiment registered for the user's email address, phone number or other means of contacting the member. The subscription is thus specific to the member irrespective of who pays for the membership, be it a company, a locality or the member. As this is s safety-alert system there is no interest of conflict for the member using the network privately as the safety of the member is always important.

The subscription is, as is indicated above, associated with access rights and the amount charged for the subscription is based on the access rights given. The access rights include number of networks a user may be a member of, and the rights to post in network and what posts or alerts that may be posted.

A lower level subscription (having few access rights) would be charged at a lower level than a higher level subscription (having many access rights). A low level subscription may even be for free.

This allows a customer (being the entity that pays for the charges/subscriptions) to set up a large network at a relatively low cost as many subscriptions may be given with low level access rights thereby enabling wide networks to be built—which in turn allows for accessing a great number of resources as the network grows.

A membership is not necessarily tied to an obligation by the member to pay for the membership, but this obligation may be given to another entity, however, the member may accept the obligation himself.

A customer may also sell memberships to other clients, and in doing so may receive part of the charges for the other clients.

The system herein enables the resources (also known as ARX devices) to interact with members of the social network, by transforming the data from the resources to text based information that is sharable in a social network. A business model of utilizing the system herein may thus be constructed as that a charge is levied for each member. The charge is based on the access rights given to the member (charge may be 0). A customer pays the charges. The charges are divided between the provider of the resources, the provider of the social network and the provider of the members. A provider of a member is not the customer, but the entity that sold the membership to the customer. The provider may thus be another customer The amount a player is rewarded may be based on the player's contribution, either relatively or by added entity (such as resource or member)

This allows for and encourages a network to grow benefitting all players, as all players are paid according to their contribution and according to the size of the network.

The charges may be applied as a one-time set-up fee and regular fees based on access rights. The one-time set-up fee may be per network and/or per member.

As an example, a first player sets up the network system and is considered as the service provider, for example a computer software developer. A second player sells subscriptions and networks to various companies, possibly as part of an insurance package and may be an insurance company. A third player enables their sensor products to operate within the system as resources. The third player is for example a safety device company or a security company. The three payers may thus cooperate to grow the network, each contributing in their own way (player 1 with functionality, player 2 with members and player 3 with resources) which will benefit them all, when sharing the charges for the memberships sold by player 2.

The business model also allows for multiple levels of players, where one player may be a customer of another player. A player may also have multiple roles. For example a security company enabling reources may also sell subscriptions along with their resources, and resellers or retailers of the resources may sell further subscriptions as all subscriptions need not be associated with a specific resource.

A member is thus associated with a player that sold the subscription to the member (or customer for the member). However, as it is the member that is associated with the subscription and not the customer, and as it is the member's safety that is at the focus, a member may switch association with a customer, but maintain the same access rights, whereby another customer will pay for the membership. The customer—or member—may also switch player and the charges applied will thus benefit another player, which opens up for healthy competition within the network, further encouraging expansion.

The invention claimed is:

1. A method for providing a safety alert in a safety-oriented and location-based network system, the system comprising at least one User Equipment (UE), the UE indicating a user that is a member of a safety-oriented and location-based network of at least one safety-oriented and location-based network that is being associated with a location, the method comprising:

the UE receiving safety-related information associated with the location of the safety-oriented and location-based network from a second member of the safety-oriented and location-based network, the second member being associated with a resource device (RD) associated with the safety oriented and location based network, wherein the resource device (RD) belongs to the second member of the safety oriented and location based network, and wherein the resource device (RD) being an active device and/or a passive device is installed and configured at the location of the safety oriented and location-based network, the safety-related information comprising a text description;

the UE displaying the safety-related information;

providing access rights to the User Equipment for receiving data from the resource device and controlling the operations of the resource device, the User Equipment thereby being connected either directly or indirectly with the resource device (RD), wherein the access rights determine a role of members of the at least one safety-oriented and location-based network, depending on a type of network that determines a level of access each member has to the safety-related information;

receiving at the User Equipment a selection of the RD, the selection being associated with a member of a different safety-oriented and location-based network and in response thereto receiving data from the RD and displaying the data of the RD;

providing at least one selectable user alert action at the User Equipment, wherein at least one user alert action is based on the received data of the RD;

receiving a selection of a user alert action at the User Equipment; and based on the level of access rights associated with the role of the member of the safety oriented and location based network, executing the user alert action, wherein the user alert action is one taken from the group comprising sending an alert and posting a notification through a transmission to at least one other member of the safety-oriented and location-based network, wherein the user indicated by the UE is also a member of a second safety-oriented and location-based network and wherein the method further comprises:

the UE receiving safety-related information associated with the second safety-oriented and location-based network from a member of the second safety-oriented and location-based network;

displaying the safety-related information associated with the second safety-oriented and location-based network; and wherein the user alert action is transmitted to at least one other member of the safety-oriented and location-based network and/or to the member of the second safety-oriented and location-based network.

2. The method according to claim 1, wherein the method further comprises enabling a UE to be a member of the safety-oriented and location-based network by comparing a locality of the UE to a locality of the safety-oriented and location-based network, and if the UE is assigned a membership status, the UE is assigned rights to the information of the safety-oriented and location-based network and to the data of the RD of the safety-oriented and location-based network.

3. The method according to claim 2, wherein the method further comprises comparing an area code (CC-I) of the UE to an area code (CC-2) of the safety-oriented and location-based network.

4. The method according to claim 1, wherein the method further comprises enabling a UE to be a member of a safety-oriented and location-based network by receiving a membership request for the UE, and if the UE is assigned a membership status, the UE is assigned rights to the information of the safety-oriented and location-based network and to the data of the RD of the safety-oriented and location-based network, regardless of a locality of the UE.

5. The method according to claim 1, wherein the method further comprises enabling a UE to be an administrator of a safety-oriented and location-based network, and enabling the administrator to assign memberships to other UEs.

6. The method according to claim 1, wherein method further comprises:
    enabling a UE to rate a post and/or notification made by another member; and
    displaying posts and/or notifications by said another member based on said rating.

7. The method according to claim 1, wherein the method further comprises providing the at least one selectable user alert action by specifying an action and including content including a position of the UE and information received and/or RD data.

8. The method according to claim 1, wherein the method further comprises:
    displaying an indicator of a RD of a network as part of displayed content;
    receiving a selection of the indicator; and in response thereto
    enable the UE to take part in sharing of the RD by displaying data of the RD as part of the displayed content.

9. The method according to claim 1, wherein the method further comprises:
    comparing a language indicator of the safety-related information to a language indicator of the UE and if the languages indicated differ, enabling a translation of the safety-related information to the language according to the language indicator of the UE.

10. A non-transitory computer-readable medium carrying computer instructions that when loaded into and executed by a controller of a UE enables the UE to implement the method according to claim 1.

11. A User Equipment, comprising
    a memory,
    a controller and a communication interface for connecting with a safety-oriented and location-based network in a safety alert network system comprising at least one safety-oriented and location-based network,
    the UE indicating a user that is a member of a safety-oriented and location-based network of at least one safety-oriented and location-based network, and the safety-oriented and location-based network being associated with a location,
    the controller being configured to:
        receive safety-related information associated with the safety-oriented and location-based network from a second member of the safety-oriented and location-based network associated with a resource device (RD) associated with the safety oriented and location based network, wherein the resource device (RD) belongs to the second member of the safety oriented and location based network, and wherein the resource device (RD) being an active device and/or a passive device is installed and configured at the location of the safety oriented and location based network, the safety-related information comprising a text description;
        display the safety-related information;
        provide access rights to the User Equipment for receiving data from the resource device RD and controlling the operations of the resource device RD, the User Equipment thereby being connected either directly or indirectly with the resource device RD, wherein the access rights determine a role of members of the at least one safety-oriented and location-based network, depending on a type of network that determines a level of access each member has to the safety-related information;
        receive a selection of the RD, the selection being associated with a member of a different safety-oriented and location-based network, wherein the UE is another member of the different network, and in response thereto receive data from the RD and display the data of the RD;
        provide at least one selectable user alert action, wherein at least one user alert action is based on the received data of the RD;
        receive a selection of a user alert action; and
        based on the level of access rights associated with the role of the member of the safety oriented and location based network, execute the user alert action, wherein the user alert action is one taken from the group comprising sending an alert and posting a notification through a transmission to at least one other member of the safety-oriented and location-based network,
    wherein the user indicated by the UE is also a member of a second safety-oriented and location-based network and
    wherein the controller is further configured to:
        receive safety-related information associated with the second safety-oriented and location-based network from a member of the second safety-oriented and location-based network;
        display the safety-related information associated with the second safety-oriented and location-based network; and
        to transmit the user alert action to at least one other member of the safety-oriented and location-based network and/or to the member of the second safety-oriented and location-based network.

* * * * *